(12) United States Patent
Claes et al.

(10) Patent No.: US 11,397,103 B2
(45) Date of Patent: Jul. 26, 2022

(54) SENSOR CIRCUIT AND USE THEREOF

(71) Applicants: Victor Augusta P. Claes, Wommelgem (BE); Bart Geraets, Wilrijk (BE); Jan Schoeters, Kapellen (BE)

(72) Inventors: Victor Augusta P. Claes, Wommelgem (BE); Bart Geraets, Wilrijk (BE); Jan Schoeters, Kapellen (BE)

( * ) Notice: Subject to any disclaimer, the term of this patent is extended or adjusted under 35 U.S.C. 154(b) by 145 days.

(21) Appl. No.: 16/967,912

(22) PCT Filed: Feb. 6, 2019

(86) PCT No.: PCT/EP2019/052937
§ 371 (c)(1),
(2) Date: Aug. 6, 2020

(87) PCT Pub. No.: WO2019/154874
PCT Pub. Date: Aug. 15, 2019

(65) Prior Publication Data
US 2021/0033446 A1    Feb. 4, 2021

(30) Foreign Application Priority Data
Feb. 6, 2018    (EP) .................................. 18155367

(51) Int. Cl.
*G01F 23/26*    (2022.01)
*G01F 23/263*   (2022.01)
*G01N 27/06*    (2006.01)

(52) U.S. Cl.
CPC .......... *G01F 23/266* (2013.01); *G01N 27/06* (2013.01)

(58) Field of Classification Search
CPC ....... G01F 23/266; G01N 27/06; G01N 27/22
See application file for complete search history.

(56) References Cited

U.S. PATENT DOCUMENTS

| | | | |
|---|---|---|---|
| 3,557,758 A * | 1/1971 | Lack .................... | A01J 5/04 119/51.02 |
| 4,392,230 A * | 7/1983 | Keller .................. | H05B 6/30 117/933 |

(Continued)

FOREIGN PATENT DOCUMENTS

| | | | |
|---|---|---|---|
| EP | 0750181 A1 | 12/1996 | |
| WO | 2004/023125 A2 | 3/2004 | |
| WO | WO-2004023125 A2 * | 3/2004 | ............. G01N 22/00 |

OTHER PUBLICATIONS

International Searching Authority of World Intellectual Property Office; International Search Report for international patent application No. PCT/EP2019/052937; dated Apr. 23, 2019.

(Continued)

*Primary Examiner* — Francis C Gray
(74) *Attorney, Agent, or Firm* — McDonnell Boehnen Hulbert & Berghoff LLP

(57) ABSTRACT

The sensor circuit (105) is configured for sensing of an electrolyte solution, such as an aqueous solution (1000) in a chamber (150). The sensor circuit comprises a signal generator configured for generating signals in a predefined frequency range above 1 MHz. It further comprises a capacitive sensor comprising a first and a second electrode (101, 102), wherein the electrolyte solution (1000) constitutes a medium of the capacitive sensor, and an output circuit for conditioning a response into a sensor signal. Herein, the capacitive sensor is part of a secondary, floating circuit which is coupled in a contactless manner to a primary circuit comprising the signal generator and the output circuit, and wherein said response is transmitted from the secondary circuit.

20 Claims, 14 Drawing Sheets

(56) References Cited

U.S. PATENT DOCUMENTS

| | | | |
|---|---|---|---|
| 5,735,167 A * | 4/1998 | Puukangas | G01F 23/266 |
| | | | 73/304 C |
| 6,546,795 B1 | 4/2003 | Dietz | |
| 7,159,456 B2 | 1/2007 | Pechtold et al. | |
| 10,432,036 B2 * | 10/2019 | Li | H02J 50/80 |
| 11,169,069 B2 * | 11/2021 | Mou | G01N 15/1459 |
| 2010/0036773 A1 * | 2/2010 | Bennett | H02J 50/12 |
| | | | 307/104 |
| 2017/0234818 A1 | 8/2017 | Jesme et al. | |
| 2020/0033178 A1 * | 1/2020 | Hanna | G01F 23/265 |

OTHER PUBLICATIONS

International Searching Authority of World Intellectual Property Office; Written Opinion for International patent application No. PCT/EP2019/052937; dated Apr. 23, 2019.

* cited by examiner

SENSOR CIRCUIT AND USE THEREOF

FIELD OF THE INVENTION

The invention relates to a sensor circuit for sensing of an electrolyte solution or variation thereof, comprising:
- a signal generator configured for generating signals in a predefined frequency range above 1 MHz;
- a capacitive sensor comprising a first and a second electrode, wherein the electrolyte solution constitutes a medium of the capacitive sensor,
- an output circuit for conditioning a response transmitted from the capacitive sensor into a sensor signal.

The invention further relates to the use of such a sensor circuit for sensing the electrolyte solution or variation thereof or therein.

The invention more particularly relates to a method of sensing an electrical conductivity of an electrolyte solution or variation thereof, comprising the steps of:
- generating a series of signals that oscillate within a range around a predetermined centre frequency;
- Transmitting said signals to a capacitive sensor, wherein the electrolyte solution constitutes a medium of the capacitive sensor;
- Conditioning said frequency-dependent response from the capacitive sensor into a sensor signal.

BACKGROUND OF THE INVENTION

The sensing of the electrical conductivity of a fluidum is a more precise form of sensing a concentration of a fluidum, more particularly a solution or dispersion or other liquid. The electrical conductivity may be linked to the concentration, if sufficient conversion data are available. Such conversion data include temperature, the type of ions and/or other charged particles in the fluidum. Such data may be known for well defined solutions, such as aqueous salt solutions of NaCl and the like, but may be less well known in other cases, for instance when sensing wastewater comprising several salts in unknown ratios. Therefore, it is common practice in the art to determine the electrical conductivity, which is also referred to as a measurement of total dissolved solids. Conductivity sensing of an electrolyte solution such as an aqueous salt solution, is typically carried out in an invasive manner, in that sensing electrodes are brought in contact—directly or indirectly over a coating with the electrolyte solutions. Examples hereof are measurement pens, also known as so-called 2-pole cells, 3-pole cells and 4-pole cells. All of these cells have to be brought into the electrolyte solution. That limits the use thereof in a variety of commercially and otherwise relevant applications. Examples thereof include biological fluids of which sterility needs to be maintained; sewerage and other pipes that are not easily accessible; sanitary applications; aqueous solutions with a very low concentration of salt, such as demineralised water and process water for use in food, chemical reactions and/or for cooling and/or heat transmission.

An alternative commercially available method involves the use of coils that are encapsulated in a polymer material which are inserted into the electrolyte solution. Such configuration makes the sensor electrodes (coils) relatively big and still insensitive. As a consequence, a large volume is needed.

It is further known from WO2004/023125 to make use of resonance for an adequate determination of a concentration of a fluid, such as a body liquid such as blood, extracellular fluid, intracellular fluid, interstitial fluid and transcellular fluid. Herein the capacitive sensor forms part of a resonant circuit that is operated at or close to its resonance frequency. Under such conditions, a change of the dielectric properties or loss properties of the electrolyte solution leads to shifts in the parameters of the resonant circuit and can therefore be measured. To measure the concentration of a substance, a microprocessor can initiate a measurement cycle consisting of a frequency sweep of a voltage controlled oscillator, as shown in FIG. 1 and FIG. 6. The sweep can start at a frequency below the expected resonance frequency of the resonant circuit and extend to a frequency thereabove. The indicated resonance frequency is in the range of 38 MHz and 58 MHz in particular. The response is obtained by a measuring circuit to define the sensor signal. Herein the phase and the amplitude of the impedance are identified. The sensor device may be disposed against a wall of the fluid chamber and/or tube.

While the use of resonance greatly improves sensitivity, it has been found that the results of the sensor circuit may deviate due to a shift in resonance frequency as a consequence of dirt, temperature variation and other disturbances. The method is sensitive for disturbances and leakage to ground. As a consequence, the method will only with small probes and in a laboratory environment provide an acceptable sensing result. In more demanding environments, such as industrial environments, the method does not provide adequate results.

An alternative embodiment is shown in FIG. 8 of WO2004/023125. This FIG. 8 basically discloses a discrete implementation of a Colpitts oscillator, of which the tank circuit is embodied by a series resonance circuit, of which the capacitor constitutes the sensor. Thus, the amplitude and frequency of the output signal of the oscillator depend on the capacitance and losses in the capacitor. The output signal goes directly into the measuring circuit. However, in this embodiment, no frequency sweep is provided. Moreover, since the oscillation frequency depends on the capacitance, the outcome is very dependent on any dirt or other material adhered to the capacitor electrodes, which lead to drift of the capacitance.

SUMMARY OF THE INVENTION

It is therefore an object of the invention to provide an improved sensor circuit suitable for reliably non-invasive sensing of the electrical conductivity of an electrolyte solution, or variation thereof. It is a further object to provide a reliable method of sensing.

According to a first aspect, the invention provides a sensor circuit for sensing of an electrical conductivity of an electrolyte solution or variation thereof, comprising (1) a signal generator configured for generating signals in a predefined frequency range above 1 MHz; (2) a capacitive sensor comprising a first and a second electrode, wherein the electrolyte solution within the chamber and/or tube constitutes a medium of the capacitive sensor, and (3) an output circuit for conditioning a response transmitted from the secondary circuit into a sensor signal. According to the invention, the capacitive sensor is part of a secondary, floating circuit which is coupled in a contactless manner to a primary circuit comprising the signal generator and the output circuit. According to a second aspect, the invention provides a method of sensing an electrical conductivity of an electrolyte solution or variation thereof, comprising the steps of:

Generating one or more signals in a predefined frequency range so as to induce resonance in a primary circuit, preferably a resonant tank circuit thereof;

Transmitting said one or more signals to a floating, secondary circuit via contactless coupling, preferably inductive coupling, which secondary circuit comprises a capacitive sensor, wherein the electrolyte solution constitutes a medium of the capacitive sensor, wherein a signal transmission to the secondary circuit has an effectiveness dependent on the electrical conductivity of the electrolyte solution, thus defining a response, wherein preferably said transmission is carried out with a coupling factor in the range of 0.05 to 0.3, preferably 0.1 to 0.2, Conditioning said frequency-dependent response from the secondary circuit into a sensor signal.

According to further aspects, the invention relates to a system and a sensor device embodying the sensor circuit of the invention.

According to the invention, the sensor is operated by increasing a load to the primary circuit, i.e. by means of energy transmission to a secondary circuit. Said load increase is however dependent on the conductivity of the electrolyte solution that constitutes part of the secondary circuit: the energy transmission depends on the extent of resonance between the primary circuit and the secondary circuit. The effective transmission of energy from the primary circuit to the secondary circuit was found to be highly dependent on whether there is resonance or not. Effectively, the configuration of the sensor circuit allows a two-step sensitivity: as a first step, resonance is to occur in the primary circuit so as to achieve absorption of energy. As a second step, the energy transmission will increase sharply when changing the frequency towards a state of resonance in the secondary circuit.

According to the invention, the contactless coupling is an inductive coupling, wherein the required inductors are part of resonant tank circuits in the primary and the secondary circuit. The coupling of the secondary circuit via a resonant tank circuit in the primary circuit is deemed advantageous, as it has been found to significantly increase the sensitivity. Moreover, the coupling via the resonant circuit in the primary circuit enables measurement of electrolyte solutions with higher electrolyte concentrations.

In a preferred embodiment, the secondary circuit comprises an inductor in addition to the capacitive sensor, which inductor is configured for the inductive coupling, which inductor and which capacitive sensor jointly constitute a resonant tank at a predefined conductivity of the electrolyte solution. This implementation of a resonant tank is deemed advantageous and effective. The secondary circuit is a closed circuit, without any connection to ground. It is preferably designed to include a few components only. Most preferably, the secondary circuit includes the inductor and the capacitive sensor and any optional resistors as its only functional components. The addition of any further functional components such as extra capacitors, transistors and/or diodes is not deemed beneficial so as to obtain an adequate sensor signal. Nevertheless, it is to be understood that—parasitic—resistances, capacitances and inductances may be present, such as for instance capacitive effects of the—dielectric material—wall of the chamber or tube, at an outside of which the electrodes are present. Cables between the inductor and the capacitor may constitute a resistance, and also the electrolyte solution has a resistance.

In this embodiment, in a state of resonance of the secondary circuit, merely the resistive component of the capacitive sensor remains. When both the primary and the secondary circuit are in a state of resonance—which is intentionally the case when the secondary circuit is in a state of resonance, the imaginary contributions to the resonant tank circuit of the primary circuit also is cancelled. This response, or the sensor signal derived therefrom can be easily identified from a series of signals, in a controller, that is preferably embodied as a microcontroller integrated circuit. In practice the response will be seen as a dip in frequency response of the secondary circuit when in a state of resonance, as the energy absorption in the circuit is at its maximum.

More preferably, the resonant tank circuit in the primary circuit is configured to have a resonance frequency. The secondary circuit is configured to have a resonance frequency defined at a predefined conductivity of the electrolyte solution, wherein a ratio of the resonance frequencies of the resonant tank circuit and the secondary circuit is in the range of 0.5 to 2.0 and most preferably 0.8 to 1.3. More preferably, the ratio of resonance frequencies is in the range of 0.9 to 1.1. It is understood that resonance frequencies do not need to match exactly, so as to ensure that the secondary circuit may start resonating and therewith absorbing energy within a frequency range close to the resonance frequency of the primary circuit. Moreover, the primary circuit may be provided with a larger bandwidth than the secondary circuit. The larger bandwidth is for instance embodied by way of the Q-factor, and/or that the primary circuit comprises a capacitive transformer circuit. The predefined conductivity of the electrolyte solution is for instance chosen as that of a physiological solution (0.9 wt % NaCl, 0.155 mole/liter). It has been found that upon increase of the electrical conductivity of the medium, which typically corresponds to an increased concentration of the electrolyte solution, the dip in frequency response of the secondary circuit at the resonance frequency becomes deeper.

The capacitive sensor electrodes may be configured on at least one wall of a tube and/or chamber defining a volume of said electrolyte solution. In this manner, the electrodes are outside the electrolyte solution and there is no risk for contamination of the electrolyte solution through the process of inserting the electrodes. In an alternative solution, the capacitive sensor electrodes and the rest of the sensor circuit are embodied in a sensor device for insertion into a volume of the electrolyte solution. Several embodiments of a sensor device will be discussed more in detail afterwards. Contamination of the electrolyte solution from the sensor device is prevented by means of hermetically enclosing the sensor device with a water-resistant protection. It is foreseen that such a sensor device may be embedded into the volume for a longer duration of time, and/or may even be fixated to a wall of the volume. Such an embedded device is deemed beneficial for instance in case of sensing in a large volume, for instance natural water such as a river or a canal. It may further be advantageous for sensing in volumes of water that are not easily accessible from an outside, but wherein a sensor device, for instance in the form of a chamber of a wall can be integrated and fixated to a wall. One implementation is for instance sensing of an electrolyte solution with a comparatively low concentration of salts, such as demineralised water, process water, in general with a concentration of at most 10% of a physiological salt solution. In various implementations, the sensitivity of such embedded 'underwater' configuration may be increased.

In an advantageous implementation, the first and second electrodes are arranged as rings at mutually different axial positions around the tube, or alternatively the chamber. The rings preferably extend circumferential to the tube, though a partial extension around the tube is not excluded. This implementation is found to provide an adequate response in a large conductivity range.

In another implementation, the first and the second electrode are axially extending strips, at different angular positions. The latter arrangement is deemed most suitable for sensing of relatively low concentrations, such as concentrations lower than that of a physiological salt solution, more preferably at concentrations of at most 10% of a physiological salt solution.

In one further implementation, the capacitive sensor may contain a first and a second pair of electrodes that are connected in parallel. This implementation may eliminate variations in conductivity within the tube of chamber, for instance due to differences in flow within the tube of chamber. As will be known to the skilled person, the capacitive contributions of two capacitors in parallel may be summed up. In a further implementation hereof, a switch is present so that the contributions of the parallel capacitive elements can be selectively switched on or off. This implementation is deemed beneficial so as to allow sensitive measurements of significantly different conductivities, but also to enable elimination of one of the capacitive elements in case of any systematic error, for instance due to local contamination.

In a further embodiment, the primary circuit and the secondary circuit are mutually inductively coupled with a coupling coefficient in the range of 0.05 to 0.3, preferably from 0.1 to 0.2. The coupling factor is known from the theory of transformers. In conventional iron-core transformers, the coupling coefficient is almost one. The preferred coupling in the invention is a so-called loose coupling. The less than ideal coupling results in damping of the response of the secondary circuit. That is deemed beneficial for filtering out noise. An optimal coupling coefficient at a resonance frequency around 10 MHz is in the range of 0.13-0.18. Lower coupling factors in the range of 0.08-0.12 are feasible in an alternative embodiment with lower resonance frequencies, for instance in the range of 5-8 MHz. The coupling coefficient is for instance tuned by means of the mutual orientation and distance of the inductors in the primary and the secondary circuit. Furthermore permittivity may be improved if so desired with the use of a core material. The inductors are for instance SMD-type inductors that are assembled on a circuit board. Alternatively, use can be made of planar inductors of which at least one is integrated into the circuit board.

Thus, in a further implementation the inductors configured for the inductive coupling between the primary and secondary circuit are arranged in or on a substrate such as a printed circuit board, which is arranged remote from the fluid chamber and/or tube. There is thus no need that the electronics of the sensor circuit, including for instance an oscillator, a controller and a dedicated circuit board need assembly in the vicinity of the fluid chamber and/or tube. This facilitates use in many applications, wherein the tube or chamber is not or not easily accessible. Furthermore, it reduces the risk that the electronics are damaged due to contact with the electrolyte solution. Preferably, the distance between the substrate and the fluid chamber and/or tube is at most 1 meter, more preferably at most 50 cm.

In again a further embodiment, the resonant tank circuit of the primary circuit is configured to have a quality factor in the range of 1-50, more preferably 2-10, such as 4-7. This quality factor is deemed to be relatively low and has the effect that a peak in the resonance is flattened. Such a flattening of the resonance peak facilitates a correct reading of the sensing result. The electrical explanation is that the flattened peak (or curve) compensates the shift of the resonance frequency due to changes in the capacitance.

Preferably, the resonant tank circuit of the secondary circuit is configured to have a quality factor in the range of 10-100, preferably 20-80, more preferably 25-50. As a consequence, the bandwidth of the secondary circuit is reduced in comparison with the bandwidth of the primary circuit. More preferably the ratio of quality factors of the resonant circuits of the secondary circuit and the primary circuit is in the range of 3-10, more preferably 4-7.

In a further embodiment, the signal generator comprises a voltage controlled oscillator (VCO). The use of a voltage controlled oscillator has been found to be effective to provide the desired high-frequency signal. In one implementation, the VCO is driven by a pulse with modulated (PWM) signal that is rectified. The PWM signal may originate from a controller, such as a microcontroller chip. The PWM signal can be rectified in known manner. A suitable implementation is the use of a filter, such as a low-pass filter or a high-pass filter and more preferably a third or fifth order pass filter. Implementations of a voltage controlled oscillator are known per se.

A Colpitts oscillator is deemed advantageous, for instance for a resonance frequency around 10 MHz, for instance between 3 and 15 MHz, such as between 5 and 7 MHz. In that range the needed capacitors and inductors can be implemented by means of commercially available components. This Colpitts oscillator configuration is preferably implemented with a N-channel JFET provided with a tuning circuit with which the oscillating frequency is set. The tuning circuit is in one implementation an LC tank circuit. This LC tank circuit is made tunable, so as to enable variation of the oscillation frequency, and thus to enable to provide a frequency sweep. One way of rendering the LC tank circuit tunable is that the capacitance is a variable capacitance, such as a varicap. The FET has a common drain configuration, creating a low impedance at its output (which is the source). Such low source impedance is beneficial so as to maximize the sensitivity of the sensor circuit.

In again a further embodiment, the signal generator is provided with a switch with which the signal generator can be switched off and on. This is beneficial for energy consumption. The term 'switching off and on' is herein understood to refer also to the situation wherein the repetition rate of the sensing is reduced, i.e. so as to enter a type of 'stand-by' state. The input signal for the switch may be taken from a controller. In one preferred embodiment, the switch is embodied as a NAND gate with a first input coupled to the oscillator and a second input coupled to a port of a controller, wherein an output of the NAND gate is coupled to the send electrode. This configuration allows switching the oscillating signal off and on, and to decrease or increase the repetition rate whenever desired, without impact on the operation of the oscillator as such.

The controller of the present invention is suitably a microcontroller chip that is provided with a circuit for generating a pulse width modulated signal and an analog-to-digital converting circuit, also known as AD converter as well as any output for defining an activity, more particularly an on/off-signal. The microcontroller chip is furthermore provided with a memory for storing reference values and with a processor for comparing reference values with one or more concentration sensing points. Additionally a driver for driving a valve of flushing means may be present. Rather than integrating all these functions into a single chip, it is not excluded that one or more portions thereof are embodied in more discrete manner, i.e. as separate components.

Preferably, the resonant tank circuit of the primary circuit is configured to have a resonance frequency that is less than a center frequency of the voltage controlled oscillator. More preferably the resonant tank circuit is configured to have a resonance frequency 0.2-0.9 times said center frequency of the voltage controlled oscillator. If the resonance frequency of the resonant tank circuit is smaller than the center frequency of the VCO, the VCO may vary its frequency starting from the center frequency (i.e. lowering) to search for said resonance frequency of the resonant tank circuit.

The primary resonant tank circuit 50 of the primary circuit 40 receives in accordance with the invention the response from the secondary circuit. This response is to be converted in the output circuit 70 into a sensor signal. In accordance with a preferred embodiment of the invention, the output signal is an output voltage. The magnitude of the output voltage defines the sensor signal and can be identified and interpreted in a controller. The output circuit 70 thereto suitably comprises a rectifier Ddc and a filter, for instance comprising a capacitor Cdc to ground. The capacitor Cdc will shunt all higher frequencies to ground and let lower frequencies go. A resistor Rdc is suitably added in parallel to prevent the capacitor from charging to a high DC voltage when there is no load attached to it. As a result, the magnitude of the signal can be detected. Preferably, the conditioning of the response into the sensor signal comprises a capacitive impedance transformation, wherein preferably a voltage ratio upstream and downstream of said impedance transformation is in the range of 1.5 to 10, for instance 2 to 5. Such impedance transformation allows an adequate read out on the basis of the available input voltage.

In the context of the present application, the term 'electrolyte solution' refers to any solution that comprises charged elements. The elements may be ions from inorganic salts, for instance including metal ions, organic charged compounds, such as quaternary ammonium ions, conjugate acid such as acetate, acrylate, sulfonate and so on. It is not excluded that solid particles are present that are dispersed in the electrolyte solution and carry any charge. The solvent of the solution may be water, but alternatively an organic solvent, such as oil.

The term 'electrical conductivity of an electrolyte solution or variation thereof' is used to indicate that the sensing may be applied to sense a variation of the electrical conductivity rather than an absolute electrical conductivity. The precision of an absolute conductivity sensing may depend both on a calibration as well as any further correction as may be necessary in case that the electrolyte solution includes solid, non-dissolved particles.

The term 'chamber and/or tube' is used to express that the method can be applied to any sensible container of fluid, irrespective of its form. Nevertheless, a cylindrical shape is deemed beneficial. The liquid in such a container may undergo a flow—either continuously or intermittently. Alternatively, the liquid may be static. The term chamber may also refer to a portion of a liquid, such that the chamber comprising the electrodes is placed in a volume of liquid. Such an implementation is for instance deemed suitable for measurements in a natural water such as a river or a lake, or for position close to an exit of a tube or container, i.e. at an "underwater" position.

In one aspect, a sensor device configured for an "underwater arrangement" is provided. It is preferred herein, that not merely the secondary circuit but also the primary circuit is present in a body of the sensor device, i.e. to be placed underwater. More particularly, the sensor circuit is in its entirety encapsulated or integrated in a water-resistant body, such as an overmoulded encapsulation of the circuit. The encapsulation may for instance be made of a transparent epoxy, a polyimide, a rubber material and so on. Alternatively or additionally, a water-resistant external layer may be present for protection of the sensor circuit. The sensor circuit may then communicate with any processor or computer via wireless or wired transmission. The said processor or computer is suitably arranged outside of the medium.

In one embodiment hereof, the sensor device comprises a chamber that is provided with at least one inlet and at least one outlet for the liquid. It is not excluded that a plurality of inlets and/or outlets is present. The said inlet(s) and outlet(s) may be arranged on opposed sides of the chamber. The chamber may then be placed into its underwater sensing position such that the flow through the chamber from inlet to outlet may be in accordance with the flow through the medium. However, the inlets and outlets may alternatively be distributed over the walls, so as to enable flow of the medium through the chamber in any direction, and to avoid the need of positioning in accordance with the flow direction.

The capacitive sensor electrodes are then again arranged on one or more wall of the chamber. One advantage of this embodiment with a hollow chamber is an increased sensitivity. In the implementation wherein the electrodes are on opposed walls, the distance between the electrodes is relatively small. In the further implementation wherein the electrodes are fully or partially ring shaped, the dielectric of the capacitive sensor comprises both the inside of the hollow chamber but also the outside thereof.

In again a further implementation, the at least one inlet and/or the outlet may be provided with a filter. Herewith, it is arranged that sensing occurs on the liquid free of particles. This may prevent disturbance of the sensing due to the impact of particles. Conductive particles may lead to a larger conductivity. The particle surface and even a liquid layer around the particle surface may also be electrically conductive due surface charge and/or polarity.

In again one further implementation, the sensor with a hollow chamber may be attached to a wall of the volume through which the medium flows. This enables a fixed position. If desired the attachment may be temporary, in that the sensor device can be removed from said volume. This allows separate cleaning. It further allows registration of the sensor results in a local memory. The memory may be read out when the sensor is removed from the volume. The temporary attachment may be embodied by means of any connector, more particularly any type of mechanical connector, as known per se.

In another embodiment of such a sensor device configured for an underwater arrangement, the sensor device is arranged so as to sense the volume at an outside of the sensor device. The sensor device may then be configured as a wall, a sphere, a cylinder, a box, with the sensor electrodes preferably arranged at an outside thereof. The sensor device may be configured to have a predefined density. In one implementation, the sensor device has a density corresponding to that of the medium, so as to arrange that it would move or be placed inside the body. In another implementation, the sensor device has a density smaller than that of the medium, and preferably such that it is arranged at a surface of the said volume. The sensor device is more preferably configured that the electrodes are arranged to be oriented towards the medium, rather than towards the air. In again a further implementation, the sensor may have a larger density, to ensure sinking to a bottom.

In sensing the conductivity, use can be made of one or more signals within a frequency range. The one or more signals may be a series of oscillating signals, such as a frequency sweep. The one or more signals may alternatively be signals at one or more predefined frequencies. A frequency sweep is preferably used for calibration of the sensor circuit at a sensing location. If a calibration of the sensing location is not feasible, as the sensing location is already in use, one may start in a frequency range that is based on earlier sensing on other locations and that have been taken from a memory. Alternatively or additionally, one may carry out a frequency sweep in a first sensing event. A limited number of signals, for instance less than 10, may be used in a sensing event, particularly in case that the concentration or conductivity of the electrolyte solution from 0.1-10 times that of a physiological salt solution. At lower concentrations, it is deemed preferable to use a series of signals for a sensing event, more preferably a frequency sweep. When sensing occurs at a sensing location repeatedly, so as to identify variation of the electrical conductivity (which can in such a case typically be linked to the concentration), a required number of signals per sensing event may decrease. Suitably, the said series have an increasing frequency or a decreasing frequency, although—in principle—another series is not excluded. The number of different frequencies and their mutual frequency shift is open to design and implementation.

Said calibration for instance comprises determining the predefined frequency range, wherein a series of signals within a range around a center frequency of an oscillator, for instance in the range of 1-50 MHz, preferably 2-10 MHz is generated to determine resonance in the resonant tank circuit and in the secondary circuit.

In one embodiment of the method of the invention, the series of oscillating signals are provided as a frequency sweep having the center frequency and a sweep span, for instance with a span width of 0.5-2.0 MHz, such as 0.8-1.5 MHz. The use of a frequency sweep is an effective manner to ensure that the resonating frequency is included. The distance in frequency between subsequent signals is open to implementation. The distance in frequency between consecutive signals is preferably small, for instance in the order of 1 to 50 kHz, preferably 2 to 10 kHz, such as 4-6 or 5 kHz. The number of signals is for instance from 20 to 1000, more preferably 50 to 500 and by further preference 100 to 300, such as 200. A single sweep is preferably carried out in a time span of 25 to 250 ms, for instance 50-200 ms, so that more than one frequency sweep per second may be provided, if so desired. The number of frequency sweeps is for instance in the range of 1-10, or 1-5. This number may vary over time, in dependence of activity, as may be programmed in the form of different activity states. It will be understood that the center frequency and the sweep span are open to optimization and may depend on the exact sensor configuration and the tube or pipe in which measurement is carried out.

It is not excluded that a first and a second sweep are given, wherein the second sweep involves a sweep in a narrower range of interest, said range of interest being identified on the basis of output signal resulting from the first sweep. It is furthermore not excluded that a sweep is repeated several times and that the output signals are summed up, for sake of increasing resolution, if so desired.

The oscillating signal is more particularly a signal that is transmitted with an oscillating frequency of 1-100 MHz, more preferably 2-50 MHz, 5-20 MHz, for instance 7-15 MHz or 5-8 MHz. Particularly in the latter range, in the context of preliminary experiments with a specific design, a positive dependence of the signal strength (defined as the voltage amplitude) on the electrolyte concentration was observed. It is observed that the optimal frequency range may be at a higher or lower frequency in dependence on tube diameter and/or electrode design. The oscillating signal is preferably generated by means of a voltage controlled oscillator. The input voltage of the controlled oscillator is suitably a DC signal. This DC signal may be generated, for instance by integrating a PWM output from the microcontroller with a low pass filter. Alternatively, it could be obtained from a microcontroller with a digital-to-analog convertor.

Furthermore, the controller may furthermore store sensing data in a memory, for future use as a reference. The sensor circuit may furthermore be coupled to obtain data, either by means of an input or from a database or connected computer, prior to use on the installed configuration. Additionally, the sensor signal may be used by the controller for any control operation in a system coupled to the tube or chamber on which the sensing is carried out. For instance, the controller may control a valve or a pump. It is however not excluded that the controller provides an output to a user and/or in the form of a digital sensing report.

In the method of the invention, the output signal is suitably in the form of an output voltage. In case that a series of signals is used, the output voltage is expected to vary for each of those signals. Since in the state of resonance of the primary and secondary circuit the energy absorption is at its maximum, the resulting output voltage will be at a minimum. At this minimum, the impedance is substantially reduced to its real portion thereof, i.e. the resistance. The conductivity can be derived from this resistance. Thereto, use is made, preferably, of an algorithm located in a controller receiving the output signal. Such algorithm for instance comprises the use of a table with references values stored in a memory. Alternatively or additionally, the algorithm may comprise calculation of the conductivity. Thereto, the controller is to be provided with input values on the sensing location. It is observed that the sensor circuit preferably includes the controller. Alternatively, a system controller or another controller remotely located from the sensor circuit could be used thereto. The controller is suitably embodied as a microcontroller integrated circuit.

In one embodiment, the method comprises the further step of conditioning said frequency-dependent response into the sensor signal comprises generating an output voltage varying in function of said response, wherein said conditioning step preferably comprises a capacitive impedance transformation. This is deemed a practical and advantageous way of arriving at a robust sensor signal. Preferably a voltage ratio upstream and downstream of said impedance transformation is in the range of 1.5 to 10, for instance 2 to 5.

In one application, the tube or chamber is an output tube of a sanitary appliance. In another application, the tube or chamber is a tubing of a circuit for a bodily fluid, such as a disposable fluid circuit for use in dialysis or apheresis. Typical bodily fluids include whole blood, plasma, red blood cells. An alternative bodily fluid is urine. In again another application, the tube may be a conduit inside or outside, such as a sewer conduit, a water conduit, an oil conduit, a conduit for transmission of any chemical, for instance within a chemical factory or production plant. Again another application resides in sensing of conductivity of substantially pure water, such as demineralised water, desalinated water, process water for use in food and other industrial processes. Sensing may also be applied on feeds and wastewater streams from said pure water generation, and/or on liquids incorporating said substantially pure water and other ingredients. Dependent on the application, the sensor circuit may be configured for single sensing of a tube or tubing or for repeated sensing in accordance with a protocol.

In one further application, the first electrode of the capacitive sensor is arranged at a location configured to be below a surface of a liquid during use. The second electrode of the capacitive sensor is arranged such as to be at least partially above said surface in a first state. This first state is a state of rest, i.e. no action. A location of the surface of the liquid may however vary. One important cause of a temporary increase in the location of said surface is that something falls into the liquid. As a consequence, the capacity of the capacitive sensor will change, particularly increase. This can be sensed by means of the sensor circuit of which the capacitive sensor is part. The sensor circuit of the invention has the advantage that even a temporary change in the location of said surface of the liquid will be sensed, i.e. by means of the amplification achieved through the wireless coupling from the primary circuit to the secondary circuit.

Therefore, in a further aspect, the invention relates to a sensor circuit for sensing of a level of a water surface, comprising:
  a signal generator configured for generating signals in a predefined frequency range above 1 MHz;
  a capacitive sensor comprising a first and a second electrode, wherein the first electrode is arranged such that at least a primary portion thereof is below the water surface regardless of any variation of the level of the water surface, and wherein the second electrode is arranged and configured such that a first part of the electrode is above the water surface and a second part thereof is below the water surface, wherein said first part and said second part vary with a variation of said level of the water surface;
and
  an output circuit for conditioning a response transmitted from the capacitive sensor into a sensor signal,
  wherein the capacitive sensor is combined with a resonance amplifier configured to amplify a signal of the capacitive sensor.

In again a further aspect, the invention relates to a method for sensing of a level of a water surface.

More particularly, the sensor circuit referred to is provided with a controller that is configured to compare a sensed variation of the location of the water surface in time with reference values stored in a memory. Preferably, the controller is further configured to control performance of any action protocol in dependence of the detected variation of the location of the water surface.

Hence, by arranging the second electrode so as that the water surface will divide the second electrode into an air area (first part) and an underwater area (second part), variations in the location of the water surface can be monitored effectively. If solid matter falls into the water, the water surface will temporarily and locally increase. This is leads to an overall increase in the dielectric constant of the medium between the first and second electrode. In itself, such increase may only be minor. However, by means of resonance amplification, this minor increase is amplified to a robust sensor signal. The term 'resonance amplification is herein used to express a situation, in which the high-frequency signal generated by the signal generator leads to a state of resonance in that the sensor arrives at a state of resonance, due to the capacitance and the inductance of the circuit of which the capacitive sensor forms part.

The first state is herein particularly refers to a reference state. For instance, in a toilet, this is a state wherein the toilet is installed, but no person uses the toilet. The second electrode is in this first state at least partially above the water surface. Suitably, the term 'at least partially' means that at least 50% of the second electrode is above the water surface. Preferably, the extension of the water surface is at least 70%, such as at least 80%. At least 90% or even 100% are furthermore feasible. Notwithstanding, it seems beneficial that the second electrode is below the water surface for a minor portion, when the water level has its reference level, for instance so as to enable the sensing of decreases in the water level as well.

In the second state, the water level is typically increased, at least temporarily, and wherein furthermore the second electrode is at least partially below the water surface. This is to be understood as that a larger portion of the second electrode is below the water surface than in the first state. For instance, at least 30%, preferably 50% of the second electrode may extend below the water surface, such as 70%, 80% or even more. Clearly, if only 10% of the second electrode is below the water surface in the first state, than an increase to 20 or 25% below the water surface can be sensed adequately. The percentages given here are intended to be percentages of the area of the second electrode. The sensitivity of certain water levels may be increased in that the second electrode has a shape different from a rectangular bar extending in the vertical direction.

Thus, preferably, the extension of the second electrode is both above the water surface and below the water surface. More preferably said extensions above and below the surface are sufficient to accommodate the inflow of solid matter and to accommodate any variation in the level of the water surface in the first state. In one implementation, the extension of the second electrode in the vertical direction is at least 6 cm, preferably at least 10 cm, or even at least 15 cm.

The second electrode is preferably arranged so as to extend in a direction perpendicular to the water surface, i.e. typically the vertical direction. However, the second electrode may include horizontal portions located at different height levels. As the capacitance is directly linked to the surface area, this enables that the capacitance will increase rather stepwise upon an increase of the water surface. Such contributes to an effective sensing. It is not excluded that another electrode pattern is applied, with a vertical extension and also with horizontal extensions.

In an alternative implementation, the second electrode comprises several strips (horizontal portions) which are not directly connected by any vertical portion but arranged in parallel—that is in the circuit. This implementation results in a sensor that identifies the height of the water surface in entirely discrete steps. Although this implementation may give less precise results, the controller may well be configured to compare such result with reference results and identify whether—and possibly how much—inflow of solid matter occurs.

In a preferred embodiment, the resonance amplification is achieved by means of the configuration in accordance to the first aspect of this disclosure, i.e. wherein the capacitive sensor is arranged in a secondary circuit which is coupled in a contactless and preferably inductive manner to the primary circuit containing the signal generator and the output circuit. Any of the further embodiments described hereinabove and hereinafter in relation thereto are also applicable, foreseen and intended in the context of this sanitary appliance comprising a water surface sensor.

In a further embodiment, the sensor circuit may further comprise a third electrode, which is located as the second electrode with respect to the water surface; thus practically at least partly above the water surface in the first state and partly below the water surface in the second state. However, such third electrode located at another position of the tube wall. The third electrode could be arranged rather at the opposed side (i.e. such that the second and third electrodes include an angle in a plane in the water surface of between 135 and 225 degrees, such as between 160 and 200 degrees). The third electrode could also be arranged such that the second electrode and the third electrode include an angle of between 60 and 120 degrees, such as between 80 and 100 degrees. The included angle could even be smaller, for instance up to 45 degrees.

In one embodiment, the second and third electrodes are arranged in parallel. They could use the same first electrode or an additional electrode could be provided. In the preferred embodiment including a primary and a secondary circuit, they would be part of the same secondary circuit. This has the advantage that the contributions of the sensing by means of the second and the third electrode add up, providing a larger signal-to-noise ratio. This embodiment appears preferable for the case that the angle between the second and third electrode is small (for instance up to 120 degrees, and more particularly up to 60 degrees).

In another embodiment, the second and third electrode are arranged to be part of separate capacitive sensors that can be sensed independently. In the preferred embodiment including a primary and a secondary circuit, the third electrode may be part of a separate secondary circuit. This has the advantage that the different locations may be sensed independently. This can provide additional information, as a increase of the water surface on one side of the wall may correspond to a variation at the other side, but not entirely on the same moment. The extra information can be used to reduce the error margin in the controller.

In one embodiment, the first electrode may be present at a bottom side of the tube. This is deemed beneficial, as it provides a good coverage of field lines. In another embodiment, the first electrode may be present at a side wall of the tube. This could be the same or a different side wall as the second electrode. In the latter case, it is not excluded that the first electrode is not entirely but just substantially below the water surface in the first state. Substantially could for instance be at least 80%.

BRIEF INTRODUCTION OF THE FIGURES

These and other aspects of the invention will be further elucidated with reference to the figures, wherein.

Figure 2:
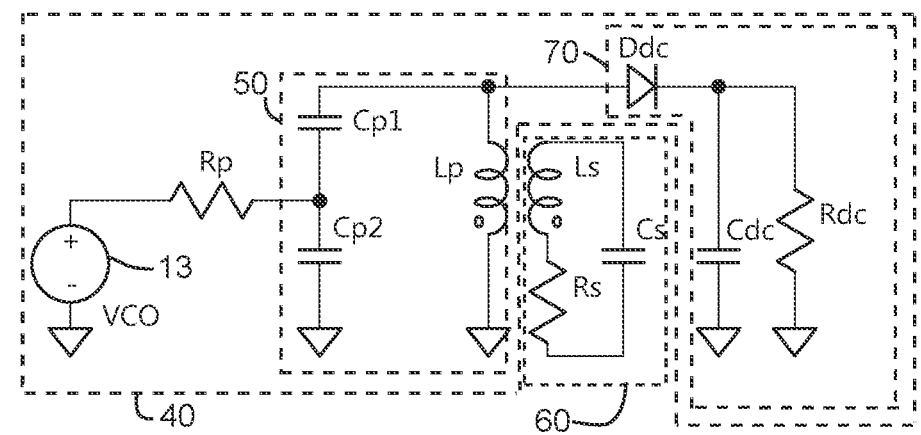
FIG. 2 shows an electric diagram of the sensor circuit including the primary and secondary circuit.
Figure 5:
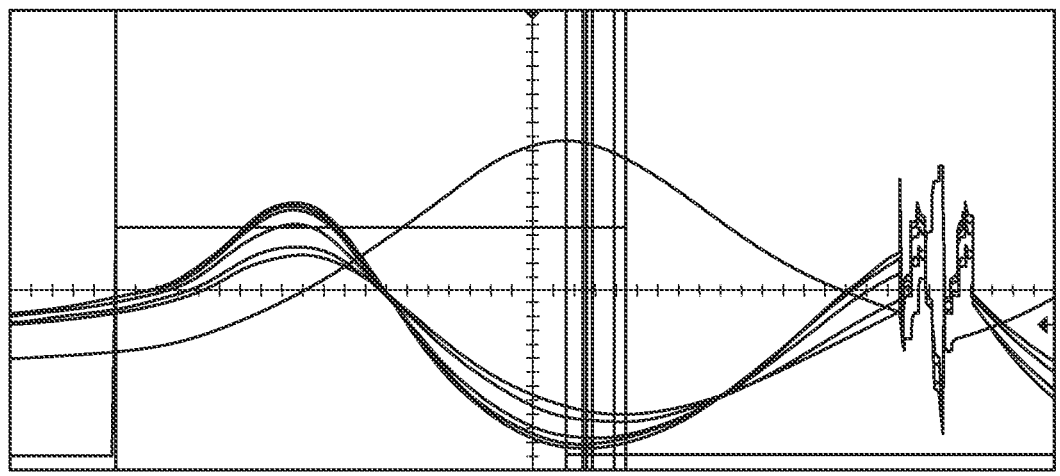
Figure 6A:
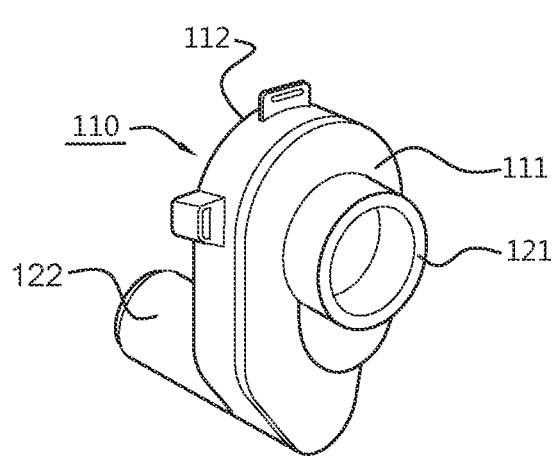
Figure 6B:
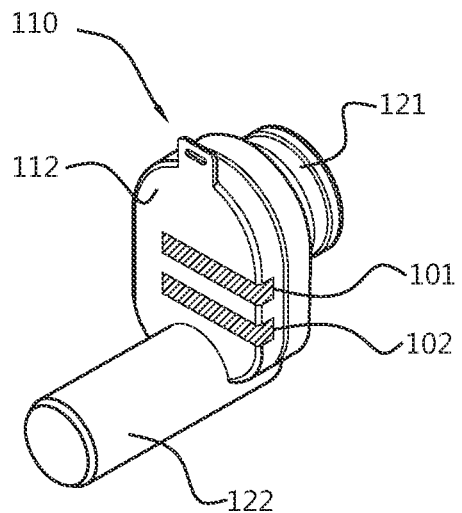
Figure 6C:
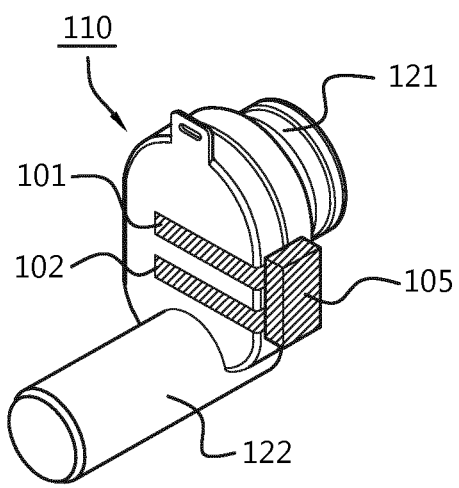
Figure 7:
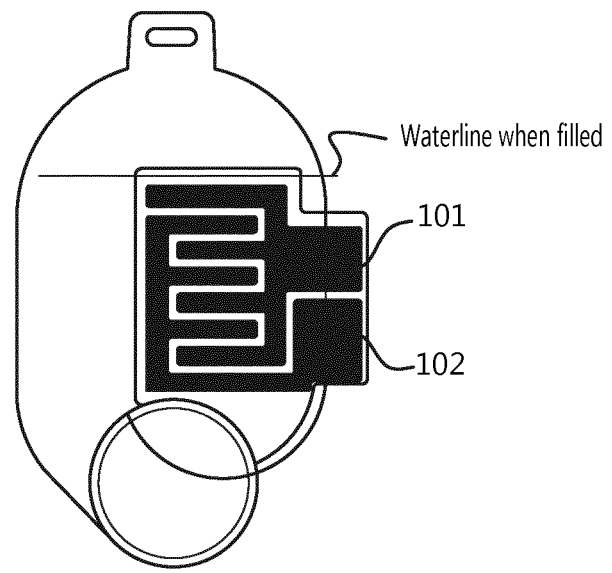
Figure 8:
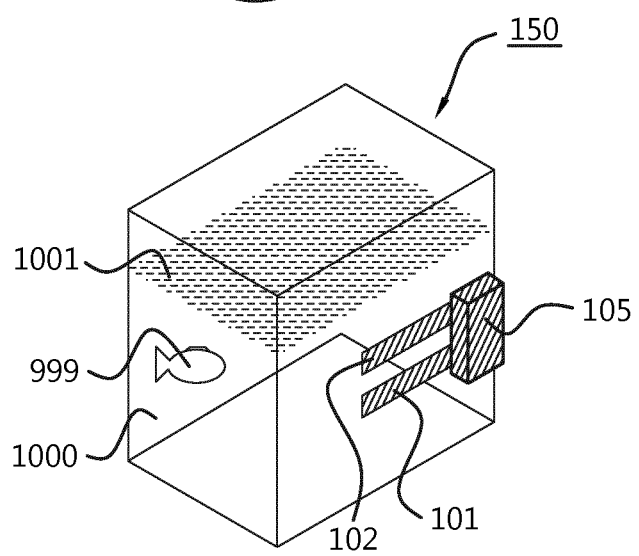
Figure 9:
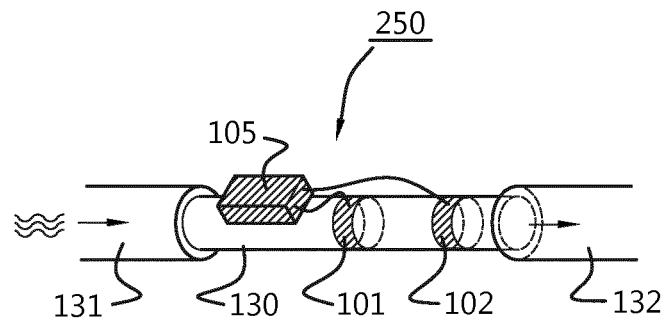
Figure 10:
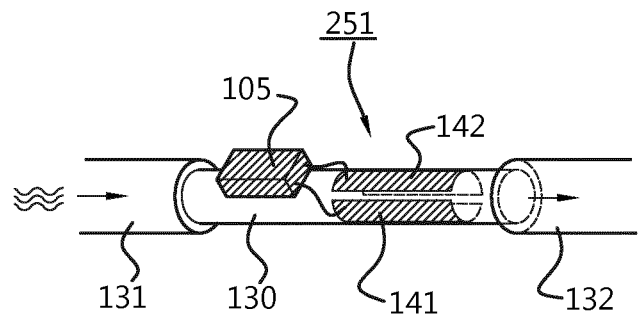
Figure 11:
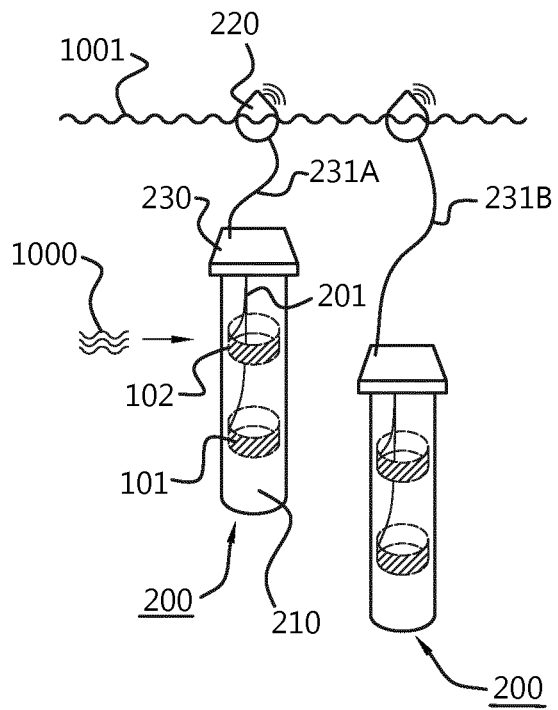
Figure 12:
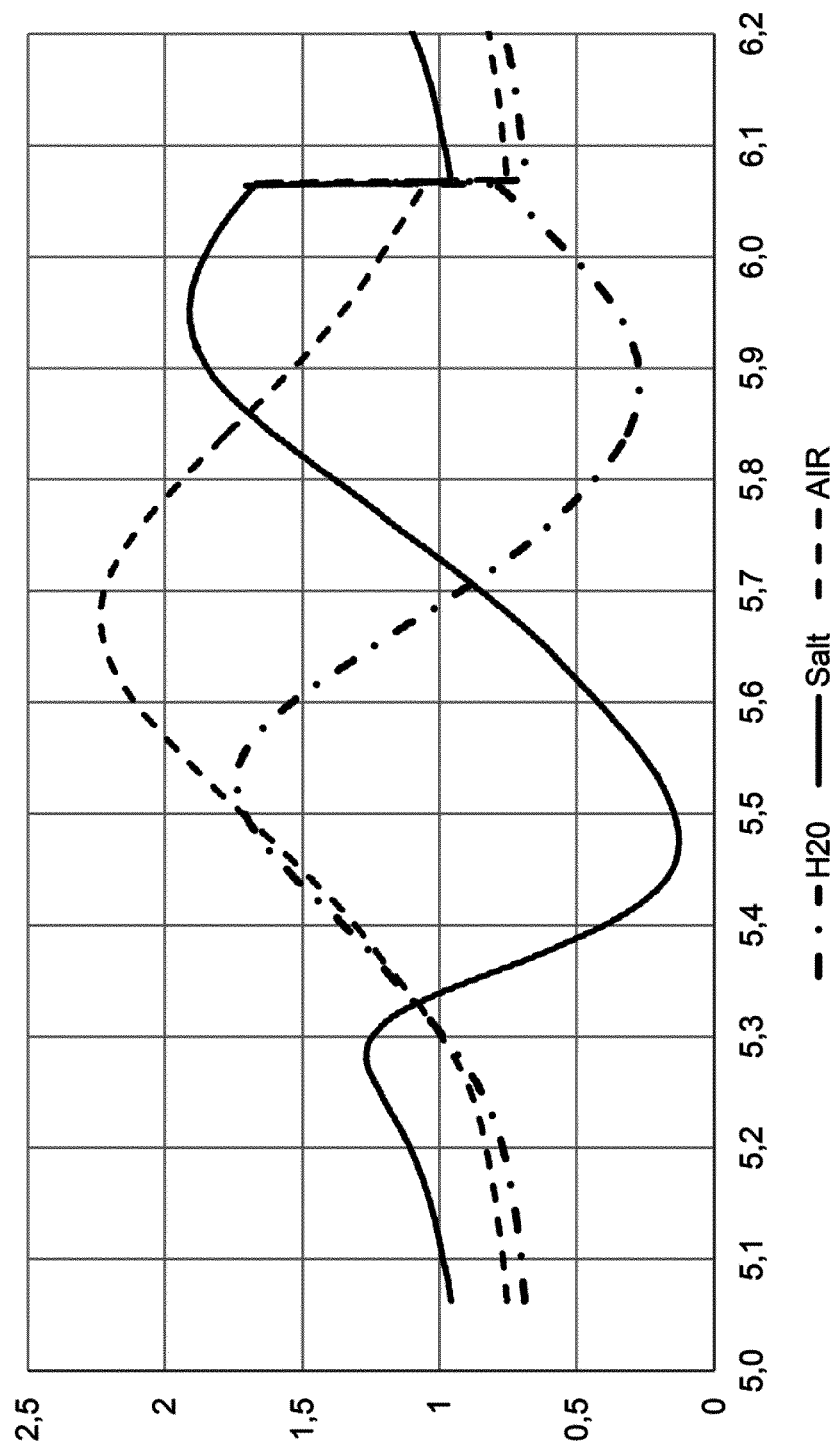
Figure 13A:
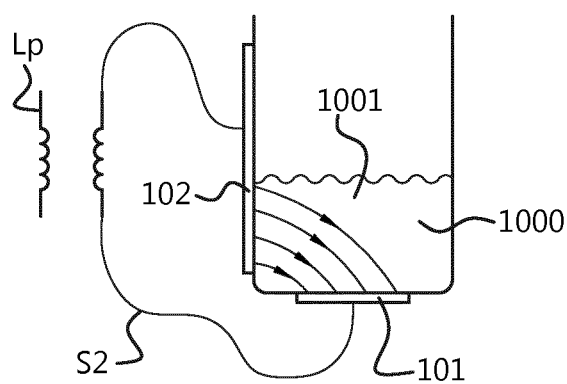
Figure 13B:
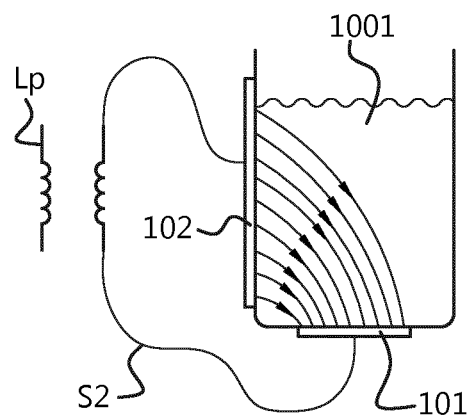
Figure 14:
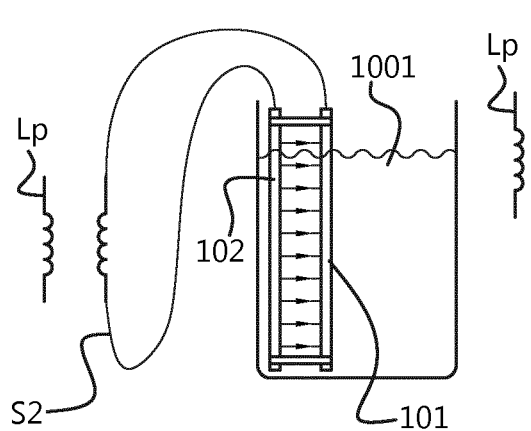
Figure 15:
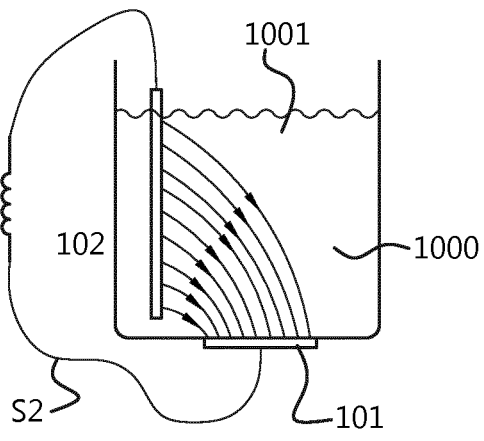
Figure 17:
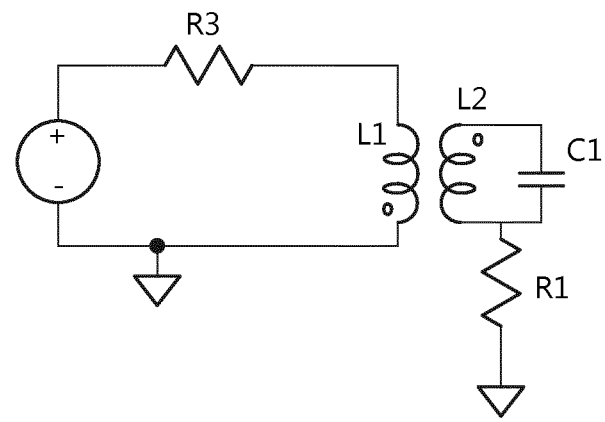

FIG. 4A, FIG. 4B, FIG. 4C, FIG. 4D, FIG. 4E, FIG. 4F, FIG. 4G, FIG. 4H, and FIG. 4I show responses of several electrolyte solutions on a test tube;

FIG. 5 shows responses of several electrolyte solutions on a test siphon;

FIG. 6A and FIG. 6B show in bird's eye perspective a first embodiment of a system comprising the electrodes of the capacitive sensor of the invention, said system being embodied as a siphon;

FIG. 6C shows in bird's eye perspective a further implementation of FIG. 6B;

FIG. 7 shows the siphon as shown in FIG. 6A-6C with an alternative arrangement of the electrodes;

FIG. 8 shows in bird's eye perspective a second embodiment of a system according to the invention;

FIG. 9 and FIG. 10 each show in bird's eye perspective a third and a fourth embodiment of a system according to the invention;

FIG. 11 shows a schematic view of an embodiment of a sensor device according to the invention;

FIG. 12 shows responses of air, tap water and salt water on a test siphon having the arrangement of electrodes shown in FIG. 7;

FIG. 13A and FIG. 13B diagrammatically show the use of the sensor of the invention for determining a level of liquid according to a first implementation;

FIG. 14 and FIG. 15 diagrammatically show the use of the sensor of the invention for determining a liquid level according to a second and a third implementation;

FIG. 16A, FIG. 16B, FIG. 16C, and FIG. 16D show a series of graphs on simulations and measurements using the circuit of the invention as specified in FIG. 2;

FIG. 17 shows an electric diagram of a prior art sensor circuit having a floating secondary circuit; and FIG. 18A, FIG. 18B, FIG. 18C, and FIG. 18D shows a series of graphs based on simulations with the circuit according to FIG. 17 and using different conditions.

DETAILED DESCRIPTION OF ILLUSTRATED EMBODIMENTS

The figures are not drawn to scale. Equal reference numerals in different figures refer to equal or corresponding elements.

Figure 1:
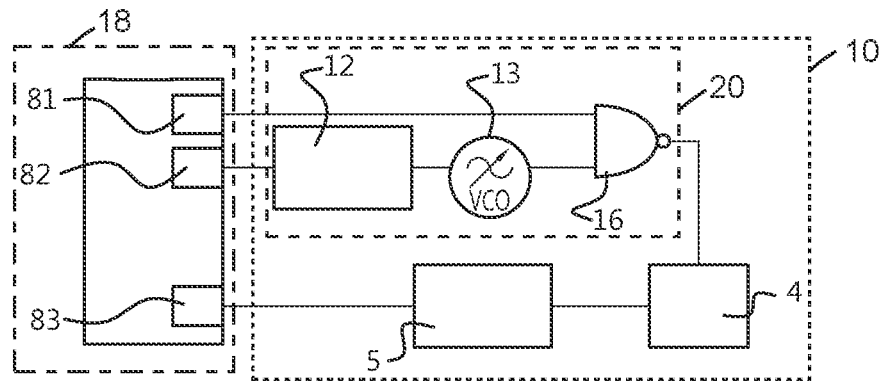
FIG. 1 shows a schematic representation of sensor circuit, including a microcontroller chip.

FIG. 1 shows a schematic diagram with a sensor circuit 10 according to the invention in combination with a microcontroller 18. The microcontroller 18 is herein embodied as an integrated circuit, embodying a plurality of signal blocks, including a pulse width modulated signal (PWM) generator 82, an A/D-converter 83, a RF on/off output 81, a processor and a memory. Such microcontrollers are commercially available from integrated circuit suppliers such as NXP, Atmel, Analog Devices, Texas Instruments. Notwithstanding this preferred implementation, it is not excluded that some of the signal blocks in the microcontroller may be embodied as separate integrated circuits or even in discrete forms, or by means of combinations thereof. Furthermore, while some functions are herein shown to be provided in the form of discrete components, it is not excluded that these are integrated into one or more integrated circuits or other integrated components, such as a passive network on a silicon substrate ("passive IC"), a component on the basis of a ceramic substrate, for instance aluminium oxide or a multilayer device known in the art as LTCC (low-temperature co-fired ceramic), or on the basis of a polymer substrate, such as a PCB with embedded components. It is not excluded either, that some of the functions are integrated into the microcontroller or into a dedicated integrated circuit, or into a multichip solution that may be provided in a single package, for instance a passive IC in addition to the microcontroller chip. For sake of clarity, it is observed that logically, the system is subdivided into a sensor circuit and a controller. Technology-wise, the microcontroller may be considered as containing blocks that stricto senso belong to the sensor circuit. For sake of simplicity, reference is made herein to the sensor circuit 10 and the microcontroller 18.

The sensor circuit 10 comprises a signal generator 20, a sensing unit 4 and an output circuit 5. The signal generator 20 comprises a plurality of elements being an integration circuit 12, more particularly a low-pass filter and a voltage controlled oscillator 13 and a NAND-block 16. The integration circuit 12 is connected between the PWM generator 82 and the voltage controlled oscillator (VCO) 13. The output signal of the VCO 13 forms one input of the NAND-block 16. It provides a signal at a desired oscillating frequency, which frequency is set in dependence of the signal coming from the PWM generator 82. The other input is taken from an on/off signal output 81 from the microcontroller 18. This signal determines whether an output signal is transmitted to the sensor unit 4, and also how long. If desired, the NAND block 16 can be left out.

FIG. 2 shows an electric diagram of the sensor circuit 10 according to a first embodiment of the invention. In this Figure, no NAND block 16 is indicated. Starting from the VCO 13, the circuit comprises a primary resonant tank circuit 50. In this embodiment, the primary resonant tank circuit 50 comprises a first and a second capacitor Cp1, Cp2 and an inductor Lp. A resistance Rp is indicated. This resistance can be either a resistor or may be due to resistive losses. The resonance frequency of the primary resonant tank circuit 50 is tuned relative to the center frequency of the VCO 13. Preferably, the resonance frequency is in the range of 0.3-1.0 times the center frequency of the VCO 13. The second capacitor Cp2 is herein coupled to ground. The first capacitor Cp1 is coupled in series with the inductor Lp, which is coupled to ground. This resonant tank circuit 50 of the primary circuit 40 has a quality factor in the range of 20-50, suitably between 30 and 40. In order to correct for output impedances in the VCO and/or other parts of the primary circuit 40, the quality factor of the resonant tank circuit 50 is preferably about half of the Q-factor of the inductor.

The primary resonant tank circuit 50 is coupled via the inductor Lp to a secondary circuit 60. In this embodiment, the secondary circuit 60 is a resonant tank circuit and comprises an inductor Ls and a capacitor Cs, that jointly constitute a cycle. A resistance Rs is included which represents the resistance of the fluid, of which the concentration is to be measured. If there is no fluid, the resistance Rs will be very high. If the fluid is a concentrated salt solution, the resistance Rs is small. In case Rs is small, the secondary circuit will absorb the energy from the primary circuit 40 at resonance. As a consequence, the response is highly dependent on the concentration of the fluid.

As shown in FIG. 1, the signal generator 20 comprises a NAND gate 16 with a first input originating from an on/off port 81 of the microcontroller 18 and a second input originating from a voltage-controlled oscillator 13. This oscillator 13 is fed by a pulse width modulated signal from the microcontroller 18 after integration in an integration unit 12. The integration unit 12 is preferably embodied as a passive low-pass filter. More preferably, a higher order low-pass filter is used, such as a third, fourth or fifth order low-pass filter. However, it is not excluded that another low-pass filter or a DAC output of a microcontroller is used. The advantage of the higher order low-pass filter is a dc signal with reduced ripple to improve frequency jitter of the VCO. Most preferred is a third order low-pass filter since the response time thereof is shorter than that of the fourth or fifth order filter.

Figure 3:
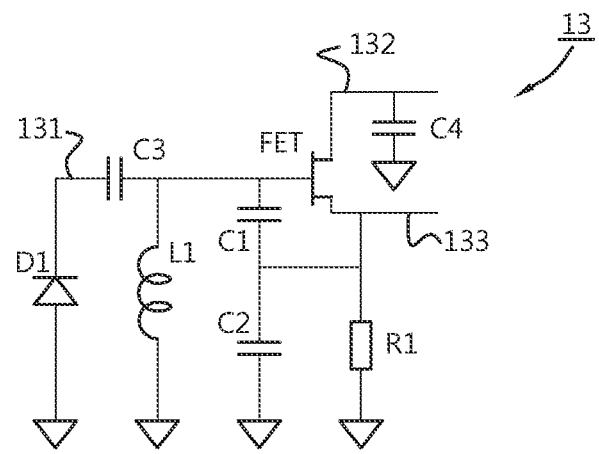
FIG. 3 shows a first embodiment of the voltage controlled oscillator.
Figure 4A:
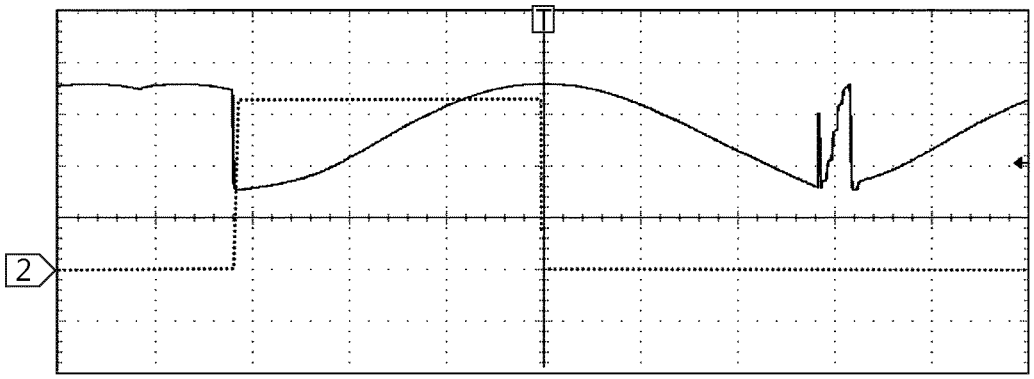
Figure 4B:
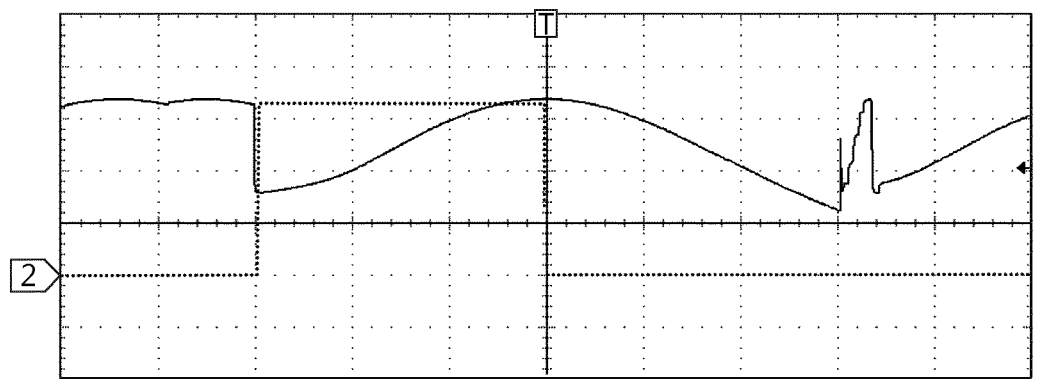
Figure 4C:
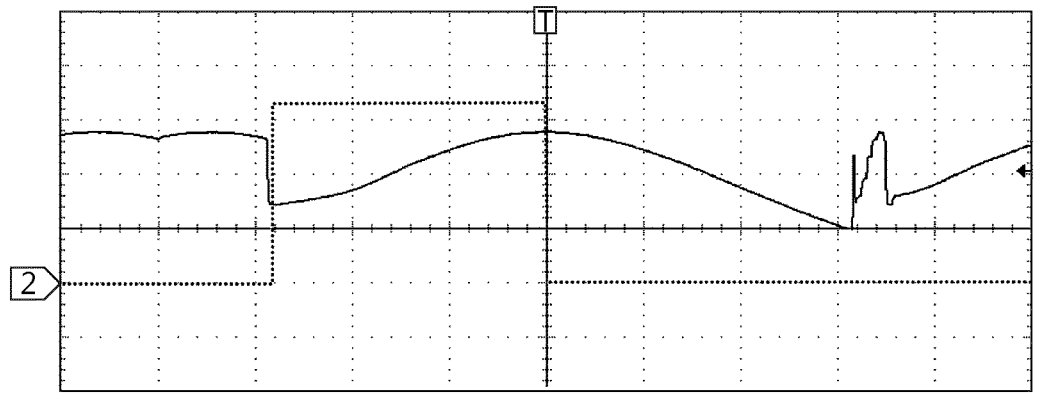
Figure 4D:
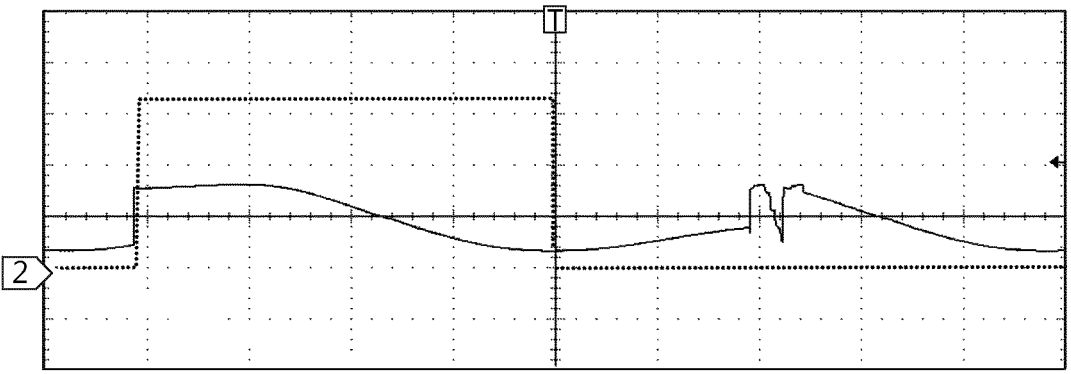
Figure 4E:
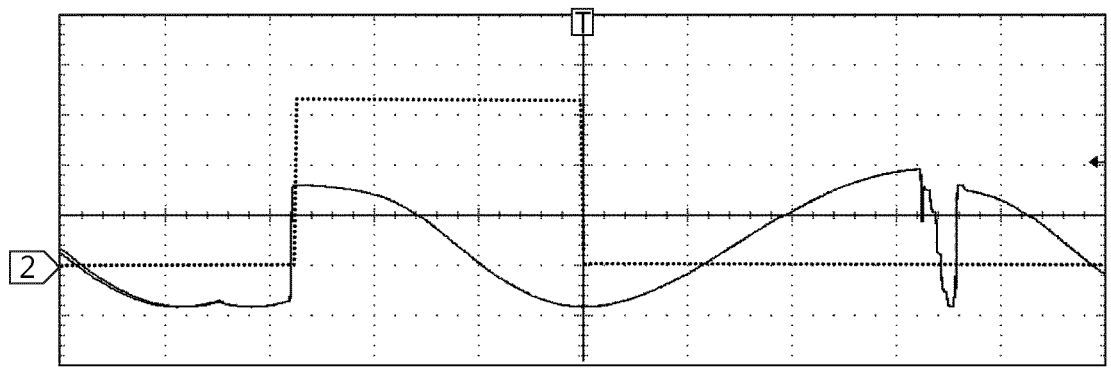
Figure 4F:
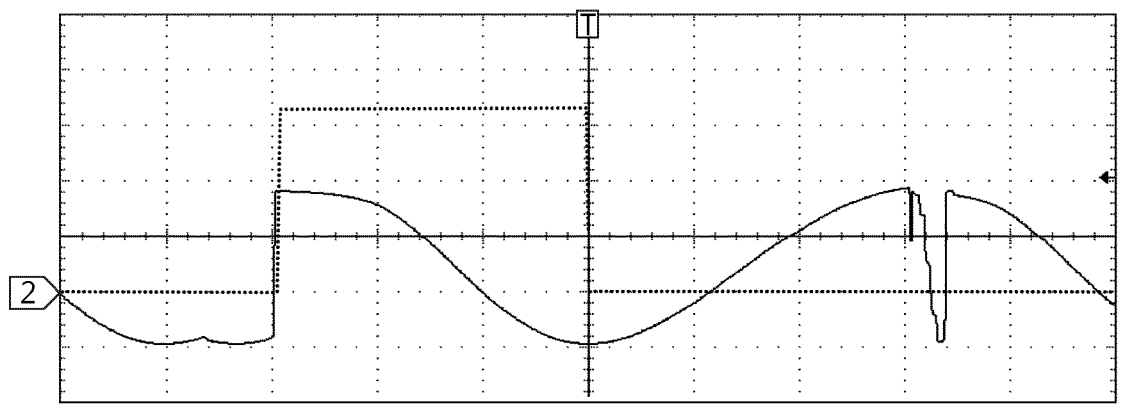
Figure 4G:
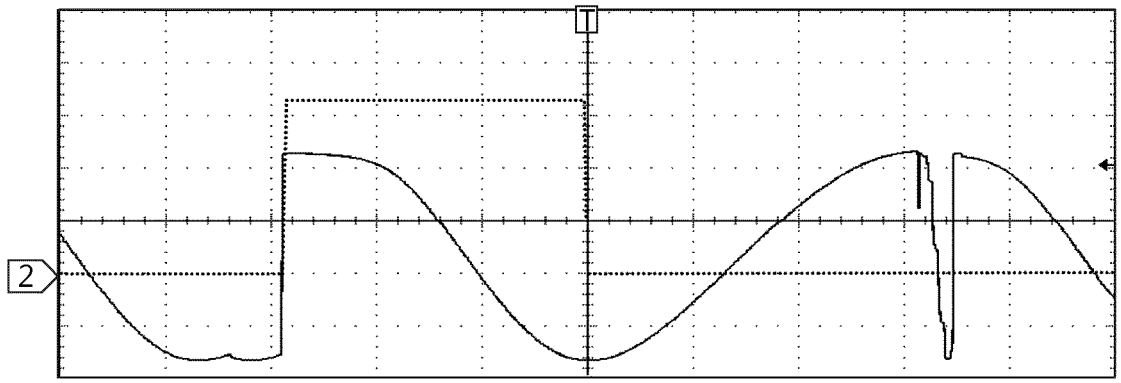
Figure 4H:
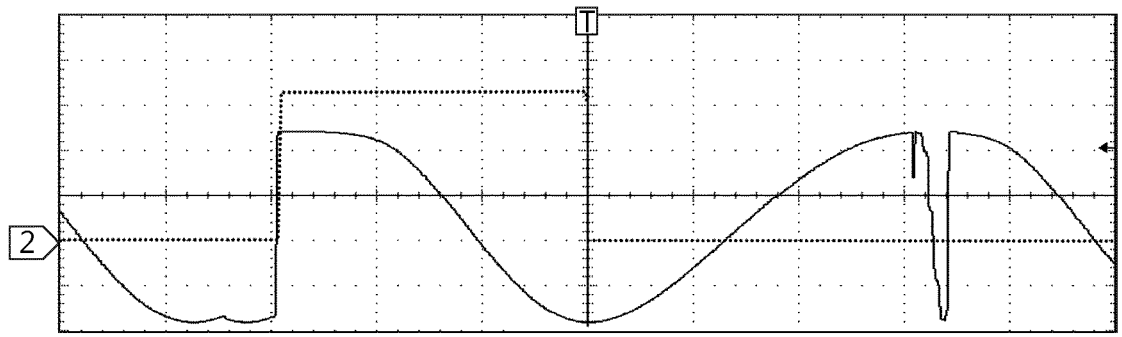
Figure 4I:
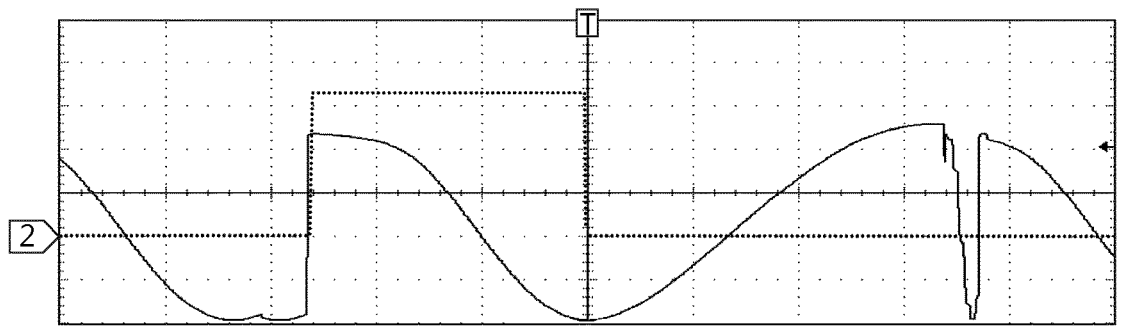

FIG. 3 shows a preferred implementation of the voltage controlled oscillator 13. It is a Colpitts oscillator. Such an oscillator comprises a transistor, more specifically a field effect transistor FET, and a tank circuit of an inductance L1 and capacitances C1 and C2 in parallel. The transistor FET is provided with a gate coupled to an input signal 131 that originates in the preferred embodiment from the low-pass filter 12 (see FIG. 1). The transistor FET is further provided with a drain carrying a signal 132, and with a source carrying the output signal 133. The tank circuit is coupled between the gate of the FET and ground. Furthermore, a connection is made between the source of the FET and the point in the tank circuit between C1 and C2. The source is further coupled to ground over a resistor R1, in addition to providing an output signal 133. In this manner, a return path is created from the transistor source to the gate. The circuit will oscillate with an oscillation frequency that is set by means of the capacitances C1, C2 in the tank circuit. In a suitable embodiment, a variable capacitor C3 and a diode D1 is added parallel to the tank circuit so that the frequency can be tuned after assembly into the desired application. The higher the voltage, the higher the capacitance. FIG. 3 also shows a capacitor C4 in relation to the drain carrying the signal 132.

FIG. 4$a$-$i$ show a series of sensing results obtained in accordance of the invention. Use was made of a test set up with an external plastic pipe and test tubes that were inserted into the plastic pipe. The plastic pipe was made of PVC and had an internal diameter of 16 mm. Ring-shaped electrodes were present on the outside of the plastic pipe. The test tubes had a corresponding outer diameter so as to fit into the plastic pipe. The electrodes were coupled to a printed circuit board that included a microcontroller chip, a voltage controlled controller oscillator, a NAND block and an output circuit in accordance with FIG. 1. The sensor circuit was set up in accordance with FIG. 2. The first inductor Lp was 22 pH and the secondary inductor was 68 µH. The capacitors Cp1, Cp2, Cdc were all chosen in the range of 100-200 pF. The inductors were embodied as SMD-components. The assembly was arranged so as to achieve a coupling factor in the range of 0.15-0.17. The resonance frequency was about 6 MHz. For the sensing, a sweep was given with a width of about 1.2 MHz, from low to high frequency. Immediately thereafter, a second series of signals was sent through the circuit. The signals in this second series corresponded to the same sweep, but the step size was 20 times as high. The output signal was shown on an oscilloscope.

In each of the FIGS. 4$a$-I, a graph is shown of the output voltage as a function of time (which corresponds to the frequency). The medium used in the experiment of FIG. 4A was air. For FIG. 4B, demineralized water was used. For FIG. 4C, tap water from the tap in Antwerp, Flanders was used. For FIG. 4D, light urine was used. For FIG. 4E, a physiological salt solution was used. For FIG. 4F heavy, or dense urine was used. FIG. 4G shows the result for sea water. FIG. 4H shows the result for a 25% saturated salt solution. FIG. 4I shows the result for a completely saturated solution. The frequency sweep was started where a background square-wave type line (indicated in grey) goes from low to high.

It is apparent from the figures that the maximum amplitude of the graph goes from high to low. A slight change in the resonance frequency was observed. The situation shown in FIG. 4A, with air as a medium corresponds to the situation wherein there is only resonance in the primary circuit. The secondary circuit is not closed, and hence no current may run through the secondary circuit. With increasing concentration of the electrolyte solution, the maximum changes into a minimum. This indicates that more and more energy is absorbed into the secondary circuit, with the effect of resonance in both the primary and the secondary circuit. The situation in FIG. 4I for a saturated salt solution corresponds to the situation, wherein all energy is absorbed into the secondary circuit. This experiment demonstrates that a change in conductivity can be measured from very low to very high, i.e. in a wide range of concentrations/conductivities.

FIG. 5 shows the sensing results of a second experiment. In this second experiment, use was made of a siphon test tube that is depicted in FIGS. 6A and 6B. The siphon contains an inlet connection 121 and an outlet tube 122. In between thereof a house 110 is present, having a front side 111 and a rear side 112. As a consequence of the form of the house, water passing through the siphon will make a movement through the house in a counter-clockwise direction. The siphon test tube is made of plastic, particularly PVC. Sensor electrodes 101, 102 were attached to the rear side 112. Copper strips were used as electrodes. The strips had a length of 7.8 cm and a width of 1.8 cm. The mutual distance between the strips was 0.3 cm. The electrodes were connected with a wire to the inductor on the printed circuit board. The same printed circuit of the earlier experiments was used. The sensing was carried in the same manner as discussed above, with a sweep and subsequently the same sweep with 20-fold increased step size. This second experiment was carried out in this manner, as it is considered as a less ideal sensing situation than a test tube, and hence more representative of conductivity sensing in practice.

In FIG. 5, the results of the various solutions are shown on top of each other in one graph. With an increase in concentration of the solution, the initially positive peak signal on the resonance frequency was converted into a negative peak signal (a dip) in the output voltage. In this experiment, it turned out that the turning point between a positive and a negative peak occurred at a lower concentration (i.e. conductivity). This shows the sensitivity at low concentrations. Furthermore, a positive peak is visible for all graphs except 1 (corresponding to air) at a lower frequency. This peak is due to the resonance in the primary circuit, prior to the occurrence of resonance in the secondary circuit. It is thus no surprise that in the graph for air, in which the secondary circuit does not contribute, this peak is not visible. The peak may be seen as the effect of generating a flattened resonance curve in the primary circuit, due to a relatively low quality factor in the primary circuit.

Table 1 provides the change in resonance frequency for the sensing results shown in FIG. 5. The indicated result is based on 150-175 counts per entry, so as to have sufficient statistics.

| Type of medium | Added volume of physiological salt solution | Resonance frequency (MHz) |
| --- | --- | --- |
| Air | | 5.763 |
| Tap water | 0 ml | 5.857 |
| Tap water | 25 ml | 5.838 |
| Tap water | 50 ml | 5.804 |
| Tap water | 75 ml | 5.796 |
| Tap water | 100 ml | 5.793 |
| Tap water | 150 ml | 5.793 |
| Tap water | 200 ml | 5.793 |
| Saturated salt solution | | 5.793 |

FIGS. 6C, 8, 9 and 10 show further embodiments of the system of the invention comprising a tube or a chamber and a sensor circuit. In each of these embodiments, the sensor circuit comprises a capacitive sensor with a first electrode 101, 141 and a second electrode 102, 142. The aqueous solution constitutes the medium of the capacitive sensor. FIG. 7 shows an alternative electrode configuration.

As shown in FIG. 6C, the sensor circuit is—beyond the sensor itself—embodied in a box 105, located at an outside of the chamber or tube. The first and second electrodes 101, 141; 102, 142 may be configured so as to extent into the box 105, or to be connected thereto by means of an interconnect. The box 105 preferably comprises the signal processor and the output circuit of the sensor circuit. The box 105 furthermore comprises the contactless transmission of the primary to the secondary circuit, preferably embodied by means of a first and a second inductor. The implementation of the elements of the sensor circuit into the box 105 is open to design. Use can be made of standard discrete components assembled on a printed circuit. Alternatively, use can be made of integrated components, such as inductors and capacitors arranged in a printed circuit board, a ceramic substrate and/or an integrated circuit based on a silicon substrate. Integration of components into substrate and/or such an integrated circuit is deemed advantage, so as that the overall number of components can be reduced. The box 105 may then comprise one or a set of encapsulated components. Such a situation is deemed preferable, in order to reduce the risk of failure due to inflow of humidity or contamination. Furthermore, the box 105 may be provided with any means for data exchange of the sensor circuit with an external medium. Such a means for data exchange may be embodied as a connector, for instance a USB-connector. Alternatively or additionally, such a means for data exchange may be embodied by means of a wireless transmission module. Such a wireless transmission module is known as such and typically comprises an transceiver, optionally a power amplifier and an antenna, all configured for a predefined transmission frequency and data protocol. Furthermore, the box 105 suitably contains a medium for energy storage, such as a battery. In this manner, the sensor circuit is not merely feasible for use at an incidental sensing operation, but also for continuous monitoring over a predefined period, with a predefined frequency, or alternatively upon provision of a signal to the sensor circuit.

FIG. 7 shows the siphon of FIGS. 6A, 6B and 6C in a diagrammatical front-view, however with a different arrangement of the first and the second electrodes 101, 102. The electrodes 101, 102 are herein shown in white, and the remaining parts in black. In the shown configuration, the electrodes are arranged as a pair of interdigitated fingers, the fingers of each electrode being interlocked. This arrangement of the first and the second electrodes 101, 102 results in an increased capacitive coupling.

The effectiveness of electrode configuration for the conductivity sensing of salt water, as opposed to either air or tap water, was demonstrated in a small experiment with the siphon. The results are shown in FIG. 11. The y-axis displaces the conductivity (relative to the initial value). The x-axis shows the resonance frequency in MHz. The dotted line represents the sensing of air, the dash-dotted line the sensing of tap water and the continuous line the sensing of salt water (with a concentration of one fourth of a saturated solution. A frequency sweep was carried out from 5 MHz to 6.2 MHz in 255 steps. The rise in frequency was 123 Hz per millisecond. The frequency response was read out on an oscilloscope.

In case of air, the secondary circuit is not connected, as there is no electric field between the primary and the secondary circuit. Hence, no energy is absorbed by the secondary circuit via inductive coupling. The response of the sensor is the frequency response of the primary circuit, and the resonance frequency is 5.68 MHz. In case that the siphon is filled with tap water, the resonance frequency (of the primary circuit) reduces to 5.52 MHz. Furthermore, a minimum occurs at 5.88 MHz, which is caused by the resonance frequency of the secondary circuit, including the inductor, the electrodes and the liquid.

In case of a salt solution, the resonance of the primary circuit is reduced further. The first maximum is found at 5.28 MHz, with a magnitude of 1.3, whereas the magnitude was 2.2 in the case of air. An additional peak in the resonance is observed at 5.95 MHz. Furthermore, resonance of the secondary circuit is shifted (relative to the case of tap water) from 5.88 MHz down to 5.47 MHz. This reduction in frequency corresponds with an increased effect of the capacitance. The signal magnitude of the minimum is even lower (0.15 versus 0.3), which is due to the higher conductivity of the water.

As shown in FIG. 8, the system may not merely be embodied with a siphon or another parts of a sanitary appliance as a chamber or tube. The system may be alternatively embodied as a chamber 150, which is an aquarium in the illustrated embodiment. As illustrated, the chamber 150 is filled with an aqueous solution 1000 up to a water surface 1001. A fish 999 swims inside the chamber 150.

The first and second electrodes 101, 141, 102, 142 may be implemented and mutually arranged in a manner so as to provide an overall capacitance that brings the sensor circuit from a first state without resonance to a second state with resonance. This depends on the configuration of the chamber or tube, and particularly on the expected conductivity of the aqueous solution: if the sensor is to be sensitive in the range of 1-10 mM, the surface area of the electrodes as well as the mutual distance will be smaller than if the sensor is to be sensitive in the range of 1-10 M.

Hence, FIG. 9 shows a system 250 for a tube 131, 132 configured for relatively high conductivity of the aqueous solution. The first and the second electrodes 101, 102 herein are ring-shaped, wherein the first electrode 101 is arranged upstream of the second electrode 102. The electrodes 101, 102 are herein shown to constitute a closed ring, but it is not excluded that such ring would be opened, i.e. the electrodes 101, 102 extend only over at least 270 degrees of the maximum 360 degrees.

FIG. 10 shows a system 251 for a tube 131, 132 configured for a relatively low conductivity of the aqueous solution. The first and second electrodes 141, 142 have a substantially rectangular shape, with a larger dimension in the axial direction than in the angular direction. The first and second electrode 141 are moreover arranged so as to be opposed to each other. It evidently goes without saying that the one electrode 141 may extend further than the other. Furthermore, rather than a single first electrode 141 and a single second electrode 142, a plurality of first electrodes 141 and second electrodes 142 could be present, for instance arranged around the tube segment 130 in an alternating arrangement.

In the embodiments of FIG. 9 and FIG. 10, a tube segment 130 is shown that is present between the tube segments 131, 132. Thus, herein, an original tube 131, 132 is to be opened and a separate 'sensor tube segment' 130 is positioned between the tube segments 131, 132. The sensor tube segment 130 may be coupled to the other tube segments 131, 132 in known manner, using a connector made of rubber, steel or the like. One typical connector is a shell. In order to view the inside for sake of understanding, the sensor tube segment 130 may be transparent, to the extent that this is accepted by the requirements of the application. For use for sensing the electrical conductivity of process water for use in food, only steel is allowed. While the interconnects between the electrodes 101, 141, 102, 142 and the box 105 are herein shown as wires, they may be implemented in other manners, such as conductor tracks on a printed circuit board or conductor tracks integrated into a moulding. In case of using wires, it is deemed preferable to apply a housing or preferably an encapsulant material for sake of protection. While the mere shown difference between the systems 250 and 251 relates to the configuration of the electrodes of the capacitive sensor, it is observed that other elements of the sensor circuit as present in the box 105 may be different as well. In one implementation, the inductors of the systems would have a different magnitude. In another implementation, the circuit is configured for a different resonance frequency.

FIG. 11 shows a further embodiment. Herein, the sensor circuit is not embodied as on a wall of the chamber or tube. Rather the sensor circuit is embodied into a sensor device 200 that is configured for use within a volume of aqueous solution. This embodiment is deemed particularly suitable for volumes of aqueous solution that are not contained in a tube or a chamber. Examples are for instance natural waters. Clearly, the sensor device 200 could further be used in addition to a sensor circuit arranged at an outside wall of a chamber or tube, for instance for calibration purposes.

As shown in FIG. 11, the sensor device comprises a body 210 provided with the first electrode 101 and the second electrode 102. These electrodes 101, 102 are shown to be ring-shaped, but an alternative configuration such as shown in FIG. 9 is not excluded. At one side, the body is provided with a circuitry element 230, which has a function comparable to the box 105 in preceding figures, i.e. to contain the signal generator and the output circuit as well as any inductors needed to define the transmission from the primary to the secondary circuit. In the illustrated embodiment, the circuitry element has such dimensions that the circuitry element 230 extends beyond the body 210. This is deemed suitable so as to increase the resistance against movement of the sensor device 200 upwards and downwards. Furthermore, such extension enables the use of inductors with a diameter larger than the diameter of the body 210. However, it is not excluded that the circuitry element 230 would have the same or smaller diameter than the body 210.

In the shown embodiment, interconnects 201 connect the electrodes 101, 102 with the circuitry element. The interconnects 201 are preferably integrated into said body 210, which is for instance created by moulding of a polymer material as known per se. It is not excluded that the body 210 is hollow, so as to create a cavity. Such cavity may be open to be filled with the aqueous solution or be closed. The advantage of opening the cavity is that the aqueous solution may extend both on the outside and on the inside of the electrodes 101, 102, potentially leading to a larger sensitivity. The body 210 may be further configured, for instance by means of lateral apertures extending to the cavity, to ensure that the aqueous solution in the cavity is refreshed adequately. In an even further implementation, such lateral apertures and optionally also a bottom aperture to the cavity may be provided with a filter, so as to prevent inflow of particles and other solid matter. The filter size may be determined on the basis of the expected size of particles and other solid matter. In again a further implementation, the body—and preferably any optional filters—is made of a barrier material constituting a barrier against adhesion. Such a barrier material is more particularly a hydrophobic material. In addition to polyolefins, fluorinated polyolefins such as Teflon are deemed adequate materials. Alternatively, the cavity may be closed. This may be suitable to ensure that the sensor device 200 has a density substantially corresponding to that of the aqueous solution, so as to ensure that the body 210 will be present in the solution below the water surface rather than either to sink to the bottom or to float on the water surface. Furthermore, the body 210 and the cavity may be arranged such that an intended bottom side of the body 210 goes down rather than moving upwards. In his respect, it is deemed preferable that at least part of the surface of the body 210—located on an inside in contact with an open cavity or at an outside is provided with a hydrophilic surface material. Such a hydrophilic surface material will lead to adhesion of the aqueous solution, limiting the risk that the sensor device 200 would be moved to the water surface and then start floating.

In the illustrated embodiment, the circuitry element 230 of the sensor device is connected by means of an interconnect 231A. 231B to a wireless transmission module 220 configured to be floating and to be present at the water surface 1001. By setting the length of the interconnect 231A, 231B between the floating wireless transmission module 220 and the circuitry element 230, the sensor location may be tuned to a predefined depth below the water surface 1001. The interconnect 231A, 231B may be implemented in any suitable manner. Instead of the use of an encapsulated electrical conductor, such as an encapsulated copper cable, use could be made of a glass fiber. Amplifiers required for the transmission along such interconnect will be provided in known manner.

FIG. 13A and FIG. 13B diagrammatically show the sensing of a level of the water surface 1001 on top of liquid 1000 by means of the first and the second capacitor electrodes 101, 102, in accordance with one embodiment. For sake of simplicity, the primary circuit is not shown in FIG. 13A and FIG. 13B, except for the primary inductor Lp. The secondary circuit S2 is diagrammatically shown. It includes a secondary inductor (named Ls in FIG. 2), as well as the capacitor electrodes 101, 102, which constitutes a capacitor with any intermediate liquid 1000 (typically water or a salt solution). In the illustrated embodiment, the first electrode 101 is arranged at a bottom of the tube, whereas the second electrode 102 is arranged at a side wall of the tube.

FIG. 13A shows the tube in a first state. Herein, the water surface 1001 is at a low level. As a consequence, the second electrode is at least partially, and in this illustrated embodiment for about 30% below the water surface 1001 and about 70% above the water surface 1001. As the air does not contribute substantially to the capacitance, the effective capacitance is defined by the 30% of the second electrode 102. An electric field with limited strength develops through the liquid 1000.

FIG. 13(b) shows the tube in a second state. Herein, the water surface 1001 is at a high level. In the illustrated embodiment, the second electrode is for about 90% below the water surface and 10% above the water surface. As a consequence, the effective area of the second electrode 102 is much larger than in the first state, and the field is stronger as indicated by a larger number of field lines running through the liquid 1000.

FIGS. 14 and 15 diagrammatically show a second and a third implementation of the sensing of the level of the water surface 1001. Rather than being arranged on walls of the tube or chamber, the second electrode 102 is part of a sensing device that is configured for insertion into a chamber or vessel of a liquid. In FIG. 14, the first electrode 101 is part of the same sensing device as the second electrode 102. In FIG. 15, the first electrode 101 is arranged at a bottom of the chamber or tube. The advantage of the implementations in FIGS. 14 and 15 is that they do not depend on the presence of a appropriate wall to which the second electrode can be attached. FIG. 14 is additionally advantageous in that the sensing device can be portable and be inserted into and removed from the chamber or tube.

Figure 16A:
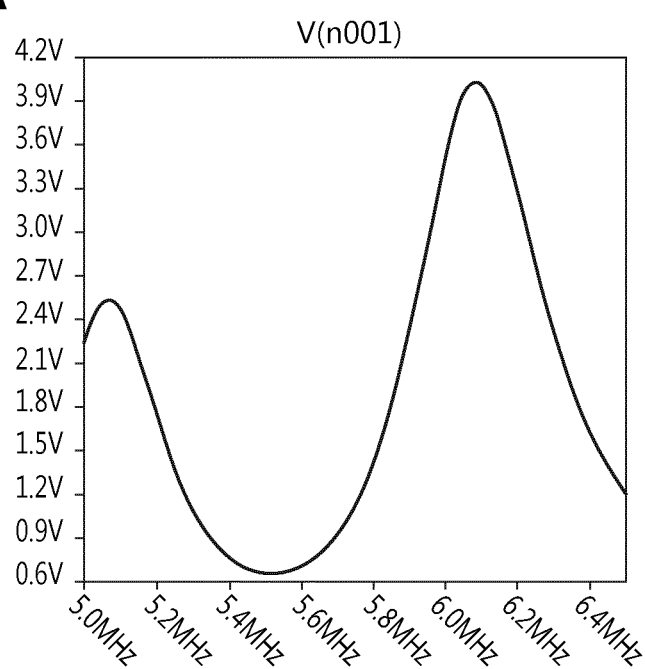
Figure 16B:
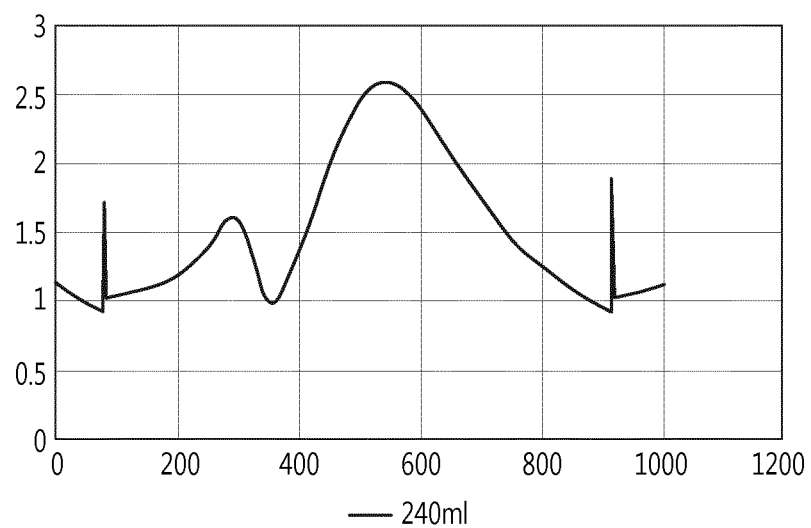
Figure 16C:
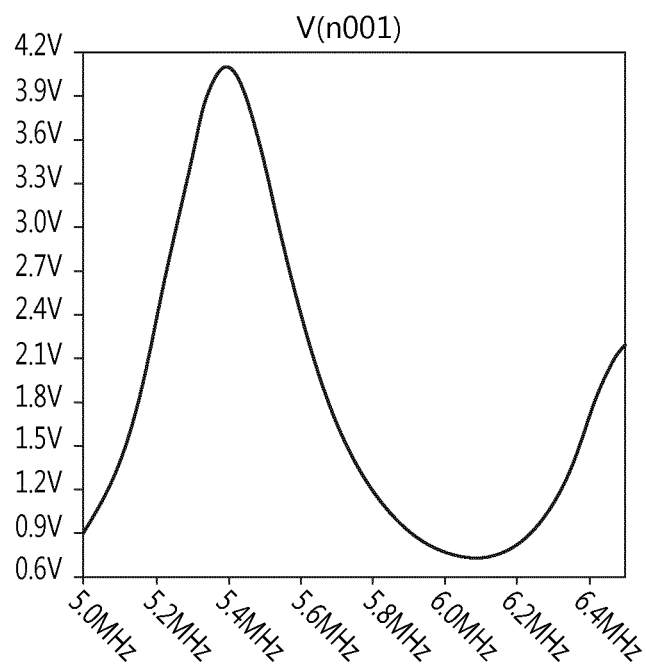
Figure 16D:
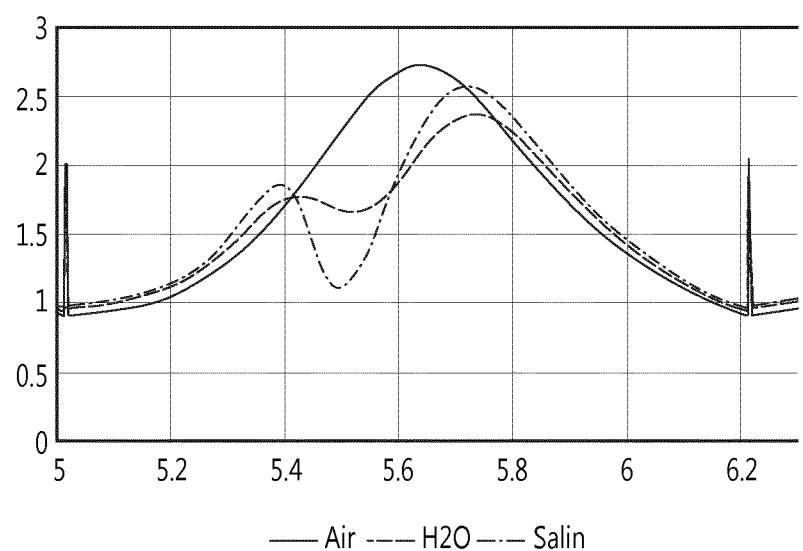

FIG. 16A-FIG. 16D shows a series of graphs based on the circuit of the invention. FIG. 16A and FIG. 16C are based on simulations, FIG. 16B is a graphs based on measurements with a circuit corresponding to FIG. 16A. In FIG. 16B, the x-as specified the volume of added saline. In FIG. 16D, this is converted into frequency. FIG. 16D shows graphs for water and air in addition to that of saline.

FIG. 16A shows the response of the circuit as a function of the frequency during a frequency sweep. The response is given in voltages. The scale on the y-axis runs from 0.6V to 4.2V. The scale on the x-axis runs from 5.0 to 6.4 MHz. The graph includes a first and a second maximum at about 5.1 MHz and about 6.1 MHz and a minimum at 5.55 MHz. The graph is to be understood as a superposition of a resonance graph for the primary circuit (with a maximum most likely between 5.8 and 6.0 MHz) and a dip due to absorption of energy into the secondary circuit. The minimum thereof is 5.55 MHz, which corresponds to the resonance frequency of the secondary circuit. The measurement is done using the component values as specified in relation to FIG. 4A-FIG. 4I above, with $Rp=10^5$ ohm, $Cp1=150$ pF, $Cp2=180$ pF and $Cs=27$ pF. The capacitance of the secondary circuit is an estimate a measurement with a salt solution.

FIG. 16C shows the response of the same circuit, for the case that the capacitance of the secondary circuit is only 5 pF. This is a smaller capacitance and thus corresponds to a lower electrolyte concentration. The capacitances $Cp1$ and $Cp2$ have been decreased to 56 pF and 68 pF respectively, Rp was 200 ohm. The result is a shift in the resonance frequency of the secondary circuit to 6.1 MHz. The response therefore now includes a maximum. This occurs at about 5.4 MHz. This graph indicates that the circuit is feasible of measuring different concentrations, but also of being optimized to different concentrations.

FIG. 16B shows the experimental response. Herein the same pattern is visible as in FIG. 16A, although the amplitudes are less high: the first maximum reaches 1.6V (rather than 2.2V). The minimum is at 1.0V (rather than 0.6V) and the second maximum reaches 2.6V (rather than 4.0V).

FIG. 16D shows the same graph as in FIG. 16B, but now with the x-axis converted to frequencies. A line is added corresponding to a measurement on air (maximum at 5.65 MHz). This line has the shape of a sine-curve and demonstrates that no energy is absorption in the secondary circuit. A further line is added corresponding to a measurement with pure water rather than with saline. It is visible that this line includes merely a small dip, corresponding to a small energy absorption into the secondary circuit.

FIG. 17 shows an electric diagram of a prior art circuit for measurement of a liquid level in a closed container as known from EP0750181A1. Said patent application relates to measurement of a liquid level in a liquid container containing an anaesthetic liquid. In the example of EP0750181A1, the said liquid is sevoflurane, which is a non-polar organic liquid (an fluorized ether compound). Based on the values given in the said patent application, it was calculated that the relative dielectric constant of this sevoflurane is about 5, which is quite long. It is therefore highly questionable that the said liquid is an electrolyte solution. In accordance with the data in EP0750181, L2 was set to 10 µH. R1 was chosen as $10^6$ Ohm. Alternating current (3V3) and R3 (1100V) were estimated so as to be comparable to those used in the simulations for FIG. 16A and FIG. 16C. The coupling factor was chosen to be 0.2, which corresponds to the value used for the graphs in FIG. 16A and FIG. 16C, which was 0.17.

Figure 18A:
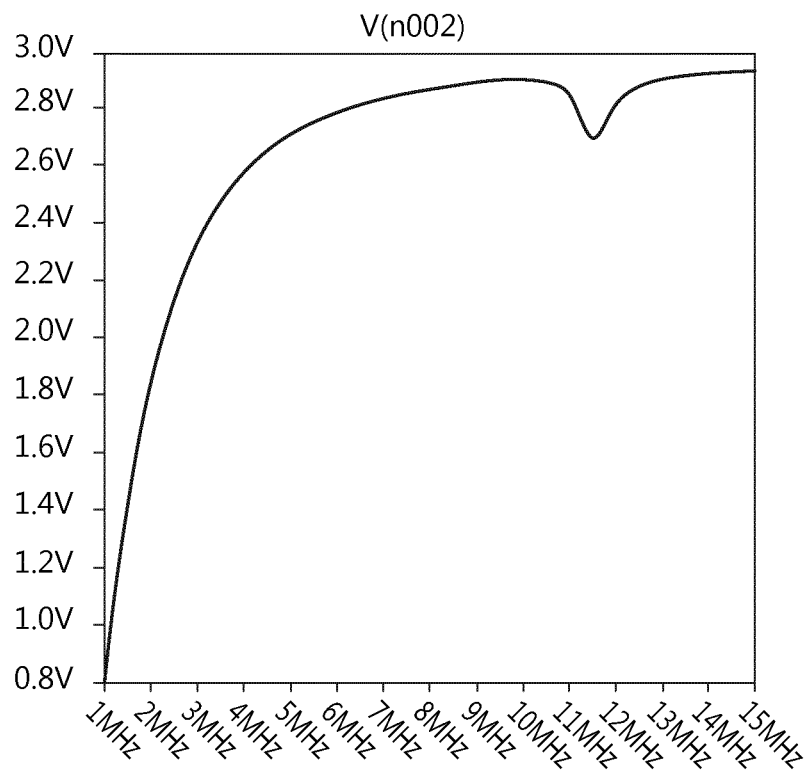

FIG. 18A shows the result for the case wherein L1 is 10 µH (as L2) and C1 is 20 pF. This is a situation that corresponds to saline. The conductivity was 18 mS. This corresponds to a NaCl-concentration of 1.0 wt % or 10 g/liter. The 20 pF corresponds to the situation wherein the container is empty. Here, the effect is that a very small dip is visible in the resonance curve, i.e. going down from 2.9V to 2.7V at a resonance frequency of about 12 MHz.

Figure 18B:
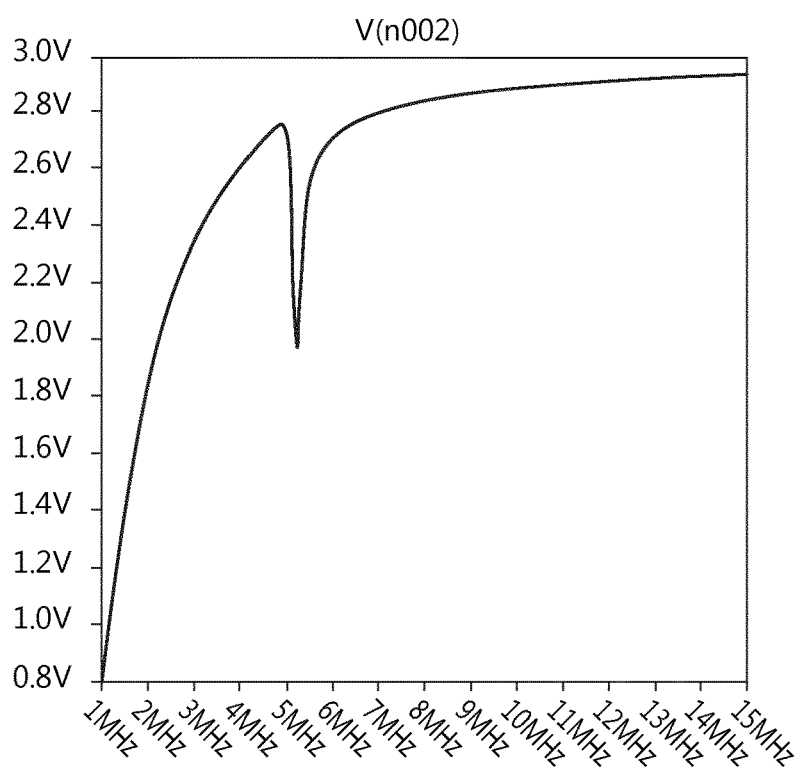

FIG. 18B shows the result for the case wherein the capacitance C1 of the secondary circuit was 98 pF. This corresponds to the situation wherein the container was filled with salt solution. Now, a dip is visible in the resonance curve from 2.8 to 2.0V. However, the dip is present at a completely different frequency, namely about 5 MHz. This complicates identifying the dip by means of a frequency sweep. Furthermore, the dip is very narrow. When signal to noise ratio reduces, it may be absorbed.

Figure 18C:
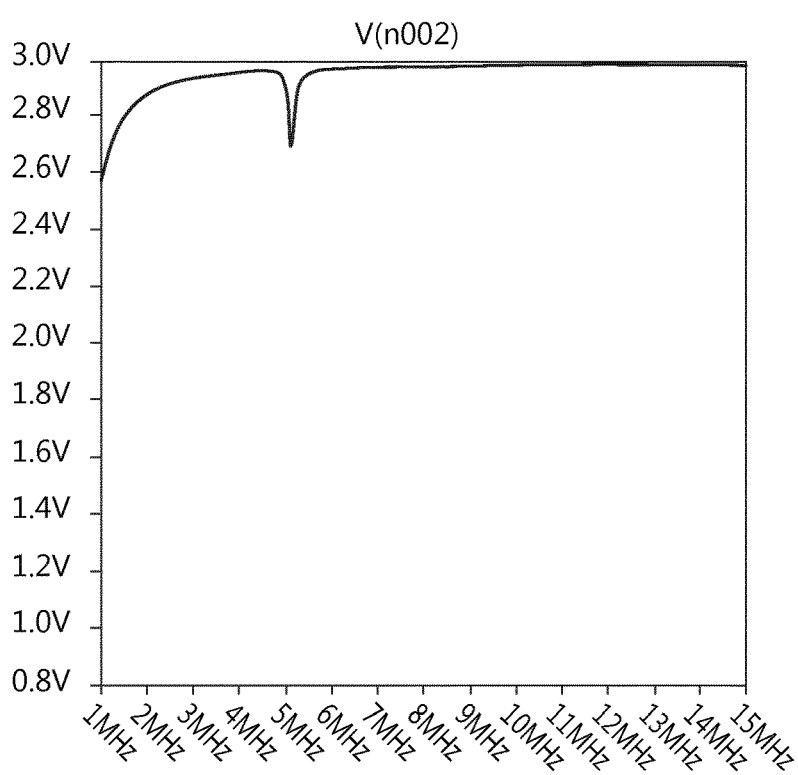

FIG. 18C shows the result for the case as in FIG. 18B with a capacitance C1 of 98 pF. However, in this case, the inductance L1 was increased from 10 to 40 µH. It is visible that the dip shrinks, from 2.9 to 2.7 V.

Figure 18D:
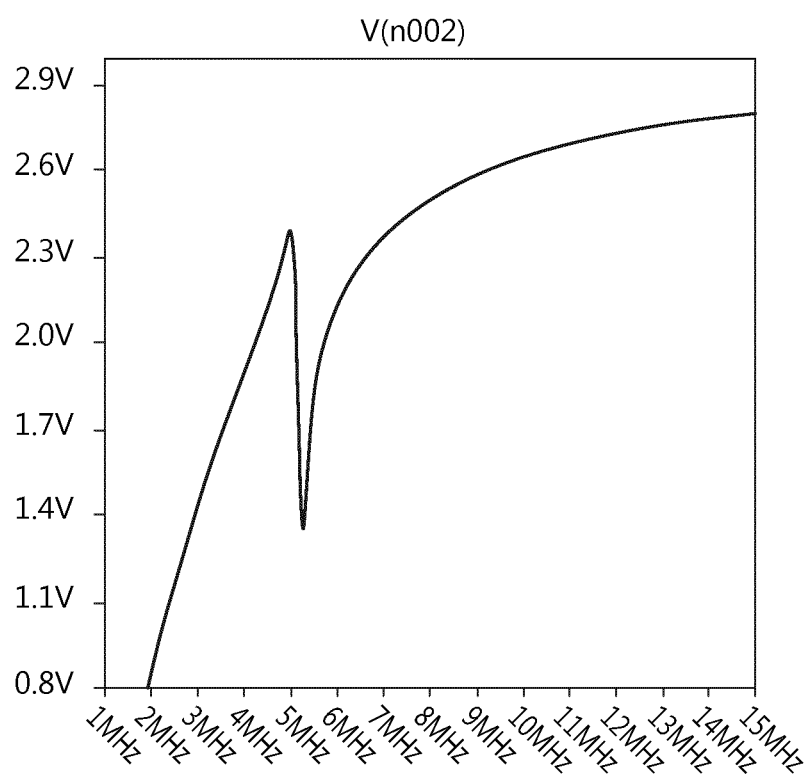

FIG. 18d shows the result for the case as in FIG. 18B and FIG. 18C with a capacitance C1 of 98 pF. However, in this case, the inductance L1 was decreased to 5 µH. This enhances the dip, from 2.4 to 1.4V.

It is observed for sake of clarity that the coupling factor of 0.2 was chosen so as to be comparable to the situation in the invention. There is however no indication in EP0750181 that such coupling factor was used. Rather a higher coupling factor is more likely. Calculations with variation of the coupling factor are shown in Table 1. It is visible that the resonance frequency is highly dependent on both the capacitance of the secondary circuit and the coupling factor between the inductors. The voltage differences at these resonance frequencies were only about 50-80 mV, which is not big. All in all, this renders it very difficult to arrive at a robust sensor system for an electrolyte solution.

TABLE 1 calculations on resonance frequency in prior art system

| Coupling factor K | Capacitance C1 (pF) | $F_{res}$ (MHz) |
|---|---|---|
| 0.2 | 96 | 5.2 |
| 0.8 | 96 | 8.3 |
| 0.2 | 20 | 11.5 |
| 0.8 | 20 | 19 |

The invention claimed is:

1. A sensor circuit for sensing of an electrolyte solution or variation thereof, comprising:
    a signal generator configured for generating signals in a predefined frequency range above 1 MHz;
    a capacitive sensor comprising a first and a second electrode, wherein the electrolyte solution constitutes a medium of the capacitive sensor; and
    an output circuit for conditioning a response into a sensor signal,
    wherein:
    the capacitive sensor is part of a secondary, floating circuit which is coupled in a contactless manner to a primary circuit comprising the signal generator and the output circuit,
    the response is transmitted from the secondary, floating circuit,
    the primary circuit further comprises a resonant tank circuit including at least one capacitor and an inductor coupled in parallel to ground,
    the secondary, floating circuit is inductively coupled to the primary circuit via the inductor of the resonant tank circuit,
    the signal generator comprises a voltage controlled oscillator, and
    the resonant tank circuit is configured to have a resonance frequency 0.5 to 2.5 times a center frequency of the voltage controlled oscillator.

2. A sensor circuit according to claim 1, wherein the primary circuit and the secondary, floating circuit are mutually inductively coupled with a coupling factor in the range of 0.05 to 0.3.

3. A sensor circuit according to claim 1, wherein the resonant tank circuit of the primary circuit is configured to have a quality factor in the range of 1 to 30.

4. A sensor circuit according to claim 1, wherein the resonant tank circuit in the primary circuit is configured to have a resonance frequency and the secondary, floating circuit is configured to have a resonance frequency defined at a predefined electrical conductivity of the electrolyte solution, wherein a ratio of the resonance frequencies of the resonant tank circuit and the secondary, floating circuit is in the range of 0.8 to 1.3.

5. A sensor circuit according to claim 1, wherein:
    the secondary, floating circuit comprises an inductor in addition to the capacitive sensor,
    the inductor is configured for the inductive coupling, and
    the inductor and the capacitive sensor jointly constitute a resonant tank at a predefined concentration of the electrolyte solution.

6. A sensor circuit according to claim 1, wherein the resonant frequency is 0.8 to 1.2 times the center frequency of the voltage controlled oscillator.

7. A system of the sensor circuit according to claim 1, the system including:
    a fluid chamber or tube having at least one wall, wherein:
    the fluid chamber or tube is configured for containing the electrolyte solution, and
    the first and the second electrode are arranged on or in the at least one wall.

8. A sensor device configured for installation within a volume of the electrolyte solution, the sensor device comprising:
    the sensor circuit according to claim 1; and
    a water-resistant protective layer configured for protecting the sensor circuit from contact with the electrolyte solution.

9. A use of the sensor circuit according to claim 1, wherein the use includes sensing an electrical conductivity of an electrolyte solution or variation thereof and/or a variation of a location of a water surface.

10. A use according to claim 9, wherein the sensing comprises the steps of:
    generating one or more signals in a predefined frequency range so as to induce resonance in a primary circuit, preferably a resonant tank circuit thereof;
    transmitting the one or more signals to a floating, secondary circuit via contactless coupling, preferably inductive coupling, wherein the secondary circuit comprises a capacitive sensor, wherein the electrolyte solution constitutes a medium of the capacitive sensor, wherein a signal transmission to the secondary circuit has an effectiveness dependent on the electrical conductivity of the electrolyte solution, thus defining a response, wherein preferably the transmission is carried out with a coupling factor in the range of 0.05 to 0.3, preferably 0.1 to 0.2; and conditioning the frequency-dependent response from the secondary circuit into a sensor signal.

11. A use according to claim 10, wherein a series of signals are provided as a frequency sweep having the center frequency and a sweep span, for instance with a span width of 0.5 to 2.0 MHz, such as 0.8 to 1.5 MHz.

12. A use according to claim 11, wherein the step of generating one or more signals is embodied as generating a series of signals within a frequency range in which resonance occurs in the primary circuit.

13. A use according to claim 10, wherein the step of generating one or more signals is embodied as generating a series of signals within a frequency range in which resonance occurs in the primary circuit.

14. A sensor circuit according to claim 2, wherein the resonant tank circuit in the primary circuit is configured to have a resonance frequency and the secondary, floating circuit is configured to have a resonance frequency defined at a predefined electrical conductivity of the electrolyte solution, wherein a ratio of the resonance frequencies of the resonant tank circuit and the secondary, floating circuit is in the range of 0.8 to 1.3.

15. A sensor circuit according to claim 3, wherein the resonant tank circuit in the primary circuit is configured to have a resonance frequency and the secondary, floating circuit is configured to have a resonance frequency defined at a predefined electrical conductivity of the electrolyte solution, wherein a ratio of the resonance frequencies of the resonant tank circuit and the secondary, floating circuit is in the range of 0.8 to 1.3.

16. A sensor circuit according to claim 2, wherein:
the secondary, floating circuit comprises an inductor in addition to the capacitive sensor,
the inductor is configured for the inductive coupling, and
the inductor and the capacitive sensor jointly constitute a resonant tank circuit at a predefined concentration of the electrolyte solution.

17. A sensor circuit according to claim 3, wherein:
the secondary, floating circuit comprises an inductor in addition to the capacitive sensor,
the inductor is configured for the inductive coupling, and
the inductor and the capacitive sensor jointly constitute a resonant tank circuit at a predefined concentration of the electrolyte solution.

18. A sensor circuit according to claim 4, wherein:
the secondary, floating circuit comprises an inductor in addition to the capacitive sensor,
the inductor is configured for the inductive coupling, and
the inductor and the capacitive sensor jointly constitute a resonant tank circuit at a predefined concentration of the electrolyte solution.

19. A sensor circuit according to claim 2, wherein the primary circuit and the secondary, floating circuit are mutually inductively coupled with a coupling factor in the range of 0.1 to 0.2.

20. A sensor circuit according to claim 1, wherein the resonant tank circuit of the primary circuit is configured to have a quality factor in the range of 2 to 10.

* * * * *